(12) United States Patent
Weigman et al.

(10) Patent No.: US 8,712,855 B1
(45) Date of Patent: Apr. 29, 2014

(54) TRANSACTION COST RECOVERY QUEUE MANAGEMENT

(71) Applicant: Bank of America Corporation, Charlotte, NC (US)

(72) Inventors: Scott A. Weigman, Charlotte, NC (US); Elbert Lee Whitler, Webster Groves, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/717,127

(22) Filed: Dec. 17, 2012

(51) Int. Cl.
*G06Q 20/00* (2012.01)
*G07B 17/00* (2006.01)
*G07F 19/00* (2006.01)

(52) U.S. Cl.
USPC ............................................. 705/16; 705/30

(58) Field of Classification Search
USPC ...................................................... 705/16, 30
See application file for complete search history.

(56) References Cited

U.S. PATENT DOCUMENTS

| | | | |
|---|---|---|---|
| 6,012,048 A | 1/2000 | Gustin et al. | |
| 6,105,001 A | 8/2000 | Masi et al. | |
| 6,129,272 A | 10/2000 | Yoshida et al. | |
| 6,626,356 B2 | 9/2003 | Davenport et al. | |
| 6,999,943 B1 | 2/2006 | Johnson et al. | |
| 7,255,200 B1 | 8/2007 | Walter | |
| 7,308,356 B2 | 12/2007 | Melaku et al. | |
| 7,379,920 B2 | 5/2008 | Leung et al. | |
| 7,387,250 B2 | 6/2008 | Muni | |
| 7,447,657 B1 | 11/2008 | Krajewski et al. | |
| 7,668,780 B2 | 2/2010 | Battaglini et al. | |
| 7,882,026 B1 | 2/2011 | Zettner | |
| 7,949,555 B2 | 5/2011 | Young et al. | |
| 2002/0049632 A1* | 4/2002 | Parkinson | 705/14 |
| 2002/0128967 A1* | 9/2002 | Meyer et al. | 705/40 |
| 2002/0143655 A1 | 10/2002 | Elston et al. | |
| 2003/0074316 A1 | 4/2003 | McCallum | |
| 2003/0126139 A1 | 7/2003 | Lee et al. | |
| 2003/0216969 A1 | 11/2003 | Bauer et al. | |
| 2004/0044627 A1 | 3/2004 | Russell et al. | |
| 2005/0004839 A1* | 1/2005 | Bakker et al. | 705/14 |

(Continued)

OTHER PUBLICATIONS

United States District Court for the Eastern District of New York, Proposed "Class Settlement Agreement," Document 1588-1, Case No. 05-MD-01720-JG-JO (In Re Payment Card Interchange Fee and Merchant Discount Antitrust Litigation), Jul. 13, 2012, Brooklyn, New York.

(Continued)

*Primary Examiner* — Ig T An
(74) *Attorney, Agent, or Firm* — Weiss & Arons LLP; Michael A. Springs, Esq.

(57) ABSTRACT

Apparatus and methods for determining a transaction cost recovery amount are provided. The transaction cost recovery amount may be determined for each of a plurality of locations. The locations may include point-of-sale terminals and/or checkout lanes. The transaction cost recovery amount may be determined based on Merchant Category Code ("MCC") information. When a customer leaves a first location associated with a first MCC, the customer may be informed of a transaction cost recovery amount at a second location. The second location may be associated with a second MCC. The transaction cost recovery amount may be determined based on a product inventory. The transaction cost recovery amount may be imposed to maintain an inventory level above a critical level. The transaction cost recovery amount may be based on a decrease and/or increase in an inventory level.

17 Claims, 12 Drawing Sheets

(56) References Cited

U.S. PATENT DOCUMENTS

| | | |
|---|---|---|
| 2006/0229998 A1 | 10/2006 | Harrison et al. |
| 2007/0124216 A1 | 5/2007 | Lucas |
| 2007/0288372 A1* | 12/2007 | Behar et al. ............... 705/41 |
| 2007/0294318 A1 | 12/2007 | Arora et al. |
| 2008/0208680 A1 | 8/2008 | Cho |
| 2008/0270275 A1 | 10/2008 | McElroy et al. |
| 2008/0275774 A1 | 11/2008 | Pepe et al. |
| 2009/0108080 A1 | 4/2009 | Meyer et al. |
| 2009/0132312 A1 | 5/2009 | Reinheimer et al. |
| 2009/0222337 A1 | 9/2009 | Sergiades |
| 2010/0250379 A1 | 9/2010 | Giordano et al. |
| 2010/0280948 A1 | 11/2010 | Cohen |
| 2011/0054992 A1 | 3/2011 | Liberty et al. |
| 2011/0125564 A1 | 5/2011 | Delillio |
| 2011/0137789 A1 | 6/2011 | Kortina et al. |
| 2011/0302080 A1 | 12/2011 | White et al. |
| 2011/0307359 A1 | 12/2011 | Gude et al. |
| 2012/0029982 A1 | 2/2012 | Andrade |
| 2012/0030045 A1 | 2/2012 | Smith, III |
| 2012/0047007 A1* | 2/2012 | Halsey et al. ............ 705/14.14 |
| 2012/0078790 A1 | 3/2012 | Ornce et al. |
| 2012/0158566 A1 | 6/2012 | Fok et al. |
| 2012/0271707 A1 | 10/2012 | Harrison et al. |

OTHER PUBLICATIONS

"Credit Card Processing Calculator" (http://www.merchantcouncil.org/merchant-account/review-compare/credit-card-calculator.php), Merchantcouncil.org, Domains by Proxy, LLC (registrant), Scottsdale, Arizona, Aug. 1, 2012.

"Interchange Profit Calculator" (http://www.greensheet.com/legacy/Interchange_Profit_Calculator.xls), The Green Sheet Inc., Santa Rosa, California, Aug. 1, 2012.

Djurdjevic, Nebo, "Commentary: Mobile payments and low value transactions" (http://www.mobilepaymentstoday.com/article/193382/Commentary-Mobile-payments-and-low-value-transactions), Mobilepaymentstoday.com, Networld Media Group (registrant), Louisville, Kentucky, Apr. 20, 2012.

Papadimitriou, Odysseas, "No Credit Cards for Purchases Under $10" (http://www.cardhub.com/edu/10-dollar-credit-card-payments/), Cardhub.com, Evolution Finance, Inc. (registrant), Arlington, Virginia, Sep. 2, 2011.

"Card security code" (http://en.wikipedia.org/wiki/Card_Code_Verification), Wikipedia.org, Wikimedia Foundation, Inc. (registrant), San Francisco, California, Sep. 27, 2012.

\* cited by examiner

| Brand | Surcharge | Exceptions |
|---|---|---|
| Bank 1 | .01 | Affinity A |
| Network 1 | .03 | Rewards B |
| Network 2 | $1.00 | ... |
| Bank 2 | .01 + 50¢ added to purchases under $10 | Transaction Network T |

POS Attributes $X_{1...J}$

| Location | Time | Date | Amount | Number of Items | State/Province | Address | Checkout No. | Credit Card Type | MCC | ... | J |
|---|---|---|---|---|---|---|---|---|---|---|---|
| 1604 | 1606 | 1608 | 1610 | 1612 | 1614 | 1616 | 1618 | 1620 | 1622 | | |

1601

Synoptic Attributes $Z_{1...L}$

| Transaction Volume | Total Sales | Fiscal Period | Credit Card Payment Ratio | Transaction Frequency | Total Transactions-Credit Card Type | Average Transaction Cost | Credit Risk | ... | L |
|---|---|---|---|---|---|---|---|---|---|
| 1621 | 1623 | 1625 | 1627 | 1629 | 1633 | 1635 | 1637 | | |

TRANSACTION COST RECOVERY QUEUE MANAGEMENT

FIELD OF TECHNOLOGY

Aspects of the disclosure relate to providing apparatus and methods for recovering a transaction cost in connection with a transaction between two or more transaction participants (hereinafter "TP").

BACKGROUND

In a transaction, a customer (the "customer") may purchase from a merchant ("the merchant") goods or services ("the product") using credit. The credit may be extended to the customer by an issuing bank (the "issuer"). The issuer may authorize the transaction before extending credit to customer. The merchant may present the transaction to an acquiring bank (the "acquirer"). Each transaction presented to the acquirer may be embodied in a transaction record. The acquirer pays the merchant for (and thus "acquires") the product. A transaction processing network in communication with the issuer and the acquirer settles the transaction between the issuer and the acquirer. The transaction processing network may collect transaction processing network fees from the issuer and the acquirer in connection with the settlement.

Settling the transaction may include the transaction network receiving a plurality of transactions from the acquirer. Each transaction may be embodied in a transaction record. In response to receiving the transaction records, the transaction network may debit an account of the issuer. The debit may correspond to the amount authorized by the issuer. The transaction network may credit an account of the acquirer. The amount credited to the acquirer may correspond to the amount authorized by the issuer.

Settlement may include a transfer of funds between two or more TPs. The transfer may be a "book transfer," an interbank transfer or any suitable transfer between TPs. A settlement network may transfer the funds between TPs. Illustrative settlement networks may include the Federal Reserve Wire Network ("Fedwire") and other suitable settlement networks that are well known to those of ordinary skill in the art. The settlement network may be any suitable network linking one or more accounts of TPs.

One TP may impose a transaction cost upon another TP for participating in the transaction. The transaction cost may be referred to as "interchange." Interchange may be a fixed fee and/or a percentage of the purchase amount. Interchange may be a fixed fee and/or a percentage of the transaction cost. Interchange may be determined based on one or more rules set by a TP or a government agency.

Interchange flows from the acquirer, through the transaction processing network, to the issuer. For example, the issuer may transfer to the acquirer an amount net interchange. The issuer typically uses interchange to cover costs of acquiring credit card customers, servicing credit card accounts, providing incentives to retain customers, mitigating fraud, covering customer credit risk, group compensation and other expenses. Interchange may be a transaction cost imposed on the acquirer.

The acquirer may deduct a merchant discount from the amount that the acquirer pays the merchant in exchange for the product. The merchant discount may cover the acquirer's transaction processing network fee, interchange, and other expenses. The merchant discount may include a profit for the acquirer. The merchant discount may be a transaction cost imposed on the merchant.

FIG. 1 shows typical credit card transaction settlement flow 100. Flow 100 involves TPs such as the merchant, the customer, and transaction service providers that are identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with a credit card. At step 3, the issuer transmits to the customer a statement showing the purchase price of ($100.00) due. The issuer collects the purchase price amount, along with interest and fees if appropriate, from the customer. At step 4, the issuer routes the purchase price amount of ($100.00) through the transaction processing network to the acquirer. At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction cost.

At step 6, the acquirer pays a transaction cost ($1.50), via the transaction processing network, to the issuer. At step 7, both the acquirer and the issuer pay a transaction cost ($0.07 for acquirer and $0.05 for the issuer) to the transaction processing network.

TABLE 1

Net positions, by participant, based on settlement flow 100 (shown in FIG. 1).

| Participant | Net ($) |
|---|---|
| Issuer | 1.45 |
| Acquirer | 0.43 |
| Transaction processing network | 0.12 |
| Merchant | −2.00 |
| Customer | 0 |

In settlement 100 (shown in FIG. 1), the transaction cost is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may set interchange rates. Interchange rates may vary for each transaction processing network. Interchange rates may vary based on merchant type and size, transaction processing method, transaction volume and other factors.

A merchant, or other TP, may impose a surcharge for accepting a credit card, establish minimum or maximum purchase price amounts or refuse to accept selected payment credit cards. The surcharge may allow the merchant to recover some or all of the transaction cost charged to the merchant by other TPs. The surcharge imposed by the merchant may be determined based on a total transaction cost associated with the transaction. The total transaction cost may include interchange, the merchant discount and network fees.

The surcharge imposed by the merchant may be determined based on inventory levels of the merchant. The surcharge imposed by the merchant may be determined based on a number of customers waiting to checkout of a merchant location. The surcharge imposed by the merchant may be determined based on customers in a vicinity of the merchant location. The surcharge imposed by the merchant may be determined based on any suitable merchant performance metric or change in performance metric.

It would be desirable, therefore, to provide apparatus and methods for determining a merchant specific transaction cost recovery amount.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 14 shows illustrative apparatus in accordance with the principles of the invention;

FIGS. 15-16 show illustrative information in accordance with the principles of the invention;

DETAILED DESCRIPTION OF THE INVENTION

Apparatus and methods for determining a transaction cost recovery amount are provided. The transaction cost recovery amount may be imposed on a transaction. The transaction may involve an acceptance of a payment instrument by a merchant. The transaction may involve a credit, debit, prepaid, automated clearing house, or any suitable payment method involving the transfer of funds from one TP to another. Table 2 shows illustrative TP types.

TABLE 2

Illustrative transaction participant types.
Illustrative TP Types

Merchant
Customer

TABLE 2-continued

Illustrative transaction participant types.
Illustrative TP Types

Authorization service provider
Clearance service provider
Settlement service provider
Issuer
Network
Acquirer
Transaction broker More than one participant of a given type may be available to participate in the transaction. Different participants of the same type may have advantages and/or disadvantages relative to the other participants of that type. For example, one issuer may be a member of a lending consortium while another is not a member, one transaction processing network may require payment of a relatively small interchange fee while another network may require payment of a relatively large interchange fee, and the like.

The transaction may be a transaction in any state of completion. The transaction may be a prospective transaction. The prospective transaction may include the customer presenting the payment instrument to pay for the product. The prospective transaction may include the merchant collecting payment instrument information from the customer.

The transaction may be a pending transaction. For example, a transaction may be pending prior to receiving authorization from the issuer. The transaction may be pending during a time between receiving the authorization and settlement. The transaction may be pending during a time prior to collection, by the issuer, of the purchase amount from the customer.

The transaction may be an executed transaction. An executed transaction may include a transaction that has been authorized and settled. Executing the transaction may include a first TP transmitting the transaction to a second TP. Executing the transaction may include a TP completing a procedure associated with the transaction. For example, a transaction may be executed after a customer accepts an amount of credit offered by the issuer.

Figure 1:
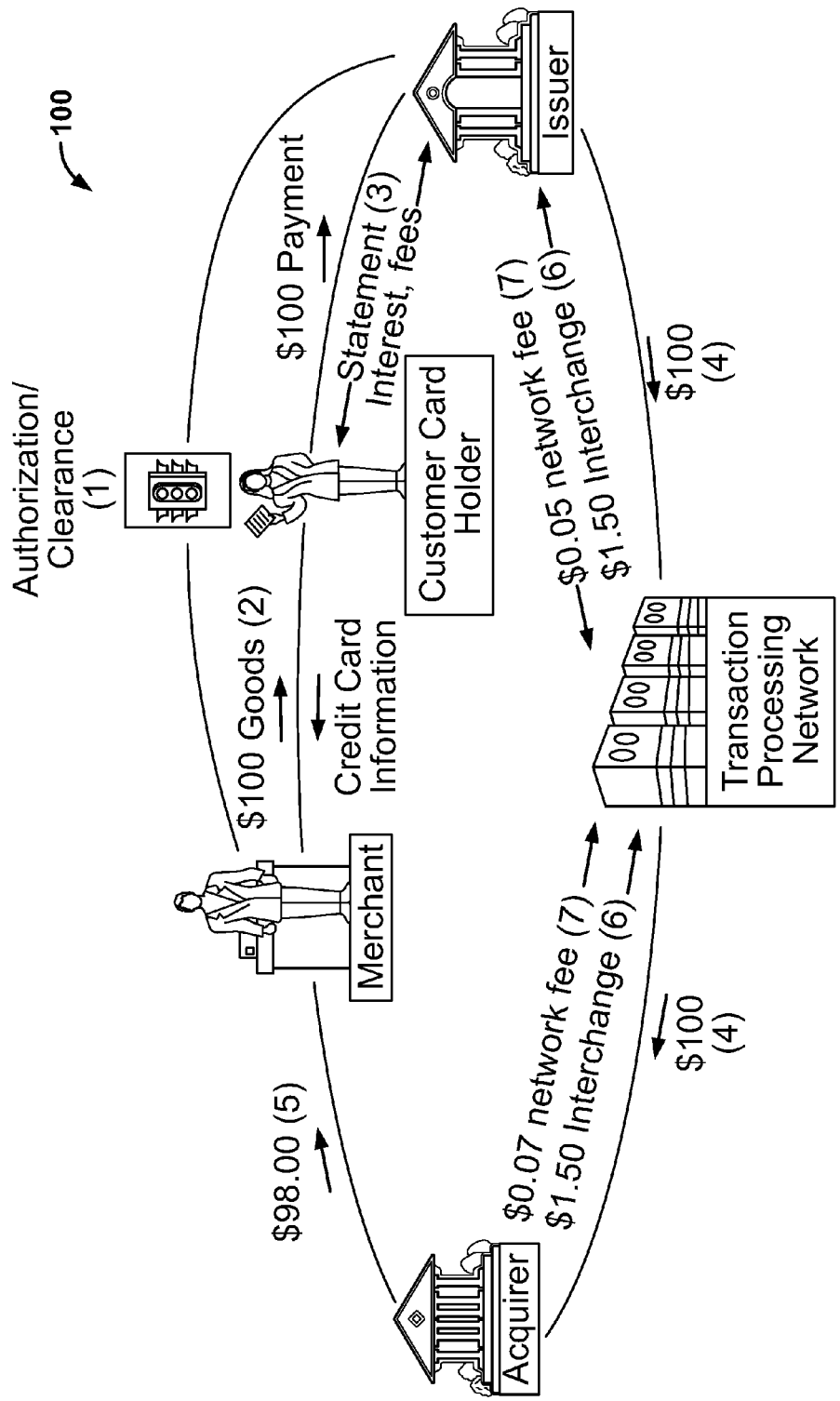
FIG. 1 shows a prior art scenario.

The transaction may be associated with one or more TPs providing transaction services. Each transaction service may be performed by a TP. In some circumstances, a participant may perform more than one of the services. Each transaction service may be associated with a transaction cost. Each participant may charge a fee for providing the service. The fee may be charged to one or more of the other participants (as shown in FIG. 1).

Illustrative transaction services are listed in Table 3.

TABLE 3

Illustrative transaction services.
Illustrative Transaction Service

Sale of goods to customer
Authorization of customer credit
Clearance of customer credit
Notice of customer balance
Invoice of customer for bank service
Invoice of network fee
Invoice of interchange fee
Matching of acquirer and issuer
Acquisition of goods
Collection of balance from customer
Settlement of merchant account
Transfer of funds to acquirer
Debit of funds from issuer TABLE 3-continued Illustrative transaction services.
Illustrative Transaction Service Transmission of surcharge notice
Identification of potential customers
Transmission of special offers The transaction may involve an acceptance of a payment instrument by a merchant. The payment instrument may be presented by a customer. The payment instrument may include a credit card and/or other forms of payment instruments. Such other forms of payment instruments may include: cash, a check, a debit card, an instrument or device that includes a contactless chip, such as an ISO14443-compliant contactless chip, a smart phone, a tablet computer, a transponder or any other suitable electronic purchasing devices. Payment instruments may store data in a magnetic strip, a bar code, a silicon chip, non-volatile computer readable media or any other suitable data storage device or format. The merchant may provide a point-of-sale ("POS") terminal that is configured to receive data from, provide data to, or exchange data with the payment instrument.

The payment instrument may be presented to the merchant by the customer as payment for the product. A transaction cost may be associated with acceptance, by the merchant, of the payment instrument as a form of payment. The transaction cost may be an acceptance cost associated with the payment instrument.

The acceptance cost may include a fee a merchant pays to other TPs. The fee may enable the merchant to accept a payment instrument as form of payment for a product. The fee may enable the merchant to establish a connection with a transaction processing network. Payment of the fee may enable the merchant to transmit/receive payments to/from a transaction network or acquirer associated with the payment instrument.

A TP that is charged a transaction cost may impose a surcharge to recoup one or more transaction fees. The surcharge may correspond to an amount charged in addition to a product price. The TP may impose the surcharge to generate a revenue stream. The TP may impose the surcharge on any other suitable TP. For example, a merchant may impose the surcharge on a customer or an acquirer may impose the surcharge on a customer.

The surcharge may be defined by one or more surcharge attributes. The surcharge attribute may be any suitable attribute of the surcharge. For example, a surcharge amount may be a surcharge attribute. The surcharge amount may correspond to an amount charged by a TP to accept a payment instrument. The surcharge amount may be charged to a customer that pays for a product using the payment instrument. The surcharge amount may be charged by a merchant that accepts the payment instrument as a form of payment. The surcharge amount may correspond to all or a portion of the merchant discount paid by the merchant.

The surcharge amount may be determined based on a percentage of the purchase amount. The surcharge amount may be determined based on a percentage of the transaction cost. The surcharge amount may be a flat fee. The surcharge amount may be a combination of a flat fee and a percentage of the purchase amount. The surcharge amount may be any suitable monetary amount.

For example, a surcharge imposed by a merchant may be associated with surcharge attributes corresponding to a surcharge amount, a region, a MCC and a payment instrument. Based on the surcharge attributes, a surcharge may be imposed on a purchase made within the region at the location associated with the MCC using the payment instrument.

The surcharge attribute may include a surcharge fraction (hereinafter "SF"). The surcharge amount may be determined based on the surcharge fraction. The surcharge amount may correspond to a fractional portion of the transaction cost. The surcharge amount may correspond to a fractional portion of the purchase amount.

The fractional portion may be a product of the SF and the transaction cost. An exemplary SF may be defined by $0 \leq SF \leq 1$. For example, if the SF is 0.3, the fractional portion may be approximately ⅓ of the transaction cost. The SF may be determined based on a performance metric. The SF may be associated with a transaction attribute.

The SF may be one. When the SF is one, the surcharge may correspond to the entire transaction cost. The SF may be zero. A SF of zero may correspond to no imposition of a surcharge. When the SF is one, the customer may bear the transaction cost. When the SF is zero, the merchant may bear the transaction cost. When the SF is between zero and one, the transaction cost may be shared by the merchant and customer.

The surcharge attribute may include a type of the payment instrument. The type of payment instrument may correspond to a brand associated with the payment instrument. The brand may correspond to a transaction processing network that processes transactions initiated using the payment instrument. The type of payment instrument may correspond to a product-type associated with the payment instrument. The product-type may correspond to a "rewards card" or other suitable features of the payment instrument. The TP may impose a surcharge based on specific attributes associated with the brand and/or product-type.

Exemplary surcharge attributes are listed below in Table 4.

TABLE 4

Illustrative Surcharge Attributes.
Illustrative Surcharge Attributes

Surcharge fraction
Total surcharge amount
Fixed fee amount
Payment instrument
Payment instrument product type
Merchant category code
Product stock keeping unit ("SKU")
Transaction network
Issuer
Surcharge imposition start time
Surcharge imposition end time
Transaction location
Transaction time The transaction may be associated with one or more transaction attributes. The transaction cost may be based on the one or more of the transaction attributes. The transaction record may include one or more surcharge attributes. A surcharge attribute may include one or more characteristics of a transaction attribute. A transaction attribute may include one or more features of a surcharge attribute.

A transaction record may be generated based on one or more transaction attributes received and/or available at a time of purchase. Each transaction record may include one or more fields. Each field may include an attribute associated with the transaction. The attribute may be represented by a value. The value may be stored in the field of the transaction record.

Table 5 shows illustrative transaction attributes and associated values.

TABLE 5

Illustrative transaction attributes and associated values.

| Illustrative Transaction Attributes | Illustrative Associated Value |
|---|---|
| Geographic | Longitude/latitude |
| | GPS coordinates |
| | Map coordinates |
| | Elevation |
| | Depth |
| | Distance from a point |
| | Address |
| | Zip code |
| | Area code |
| | County |
| | State |
| | Country |
| | IP address |
| | Signal triangulation |
| Temporal | Seconds |
| | Minutes |
| | Hours |
| | Day |
| | Week |
| | Month |
| | Year |
| | Duration |
| Synoptic | Weather at time of transaction |
| | Stock market performance at time of transaction |
| | Political party in power at time of transaction |
| | TP credit risk |
| Transaction amount | Dollars |
| | Available credit |
| | Currency |
| | Foreign exchange rate |
| | Low value purchase |
| Number of items purchased | Number |
| | Number of distinct stock keeping units ("SKU") |
| | Purchase amount per item |
| Merchant category code | Numerical identifier |
| | Taxation status |
| | Associated acquirer |
| Surcharge | Surcharge amount |
| | Surcharge fraction |
| | Maximum surcharge |
| | Minimum surcharge |
| | Percentage of purchase |
| | Fixed amount |
| Payment instrument identifier | Brand |
| | Rewards |
| | Transaction Network |
| | Issuer |
| | Affinity |
| Loyalty program | Rewards/point balance |
| | Membership level |
| | Duration of membership |
| | Frequency of use |
| Access Channel | Point-of-sale |
| | Automated teller machine |
| | Online portal |
| | Self-service kiosk |
| | Mobile device |
| | In person |

Transaction Cost Recovery Queue Management

Apparatus may include one or more non-transitory computer-readable media. The computer-readable media may store computer-executable instructions. The computer executable instructions, when executed by a processor on a computer system, may perform a method for managing a queue at a merchant location.

The one or more merchant locations may be "brick and mortar" locations, online locations, mobile locations or any suitable location.

For example, a merchant deploy sales agents at a location. The location may be a trade show, an entertainment event political rally or other temporary venues. The merchant may process transactions at the temporary venue using a mobile device. The merchant may offer special or promotional pricing scheme at the temporary venue. The promotional pricing may include no surcharging at the temporary venue.

The surcharge behavior at the temporary venue may be associated with a transaction attribute corresponding to a geographic region. The surcharge behavior at the temporary venue may be associated with a transaction attribute corresponding to a mobile device configured to process transactions at the temporary venue.

The method may include imposing a first surcharge at a first checkout lane. The method may include monitoring transaction activity at the first checkout lane. Monitoring the transaction activity may include monitoring a number of transactions processed by a point-of-sale ("POS") device during a pre-determined period of time. The POS device may be a POS terminal. Monitoring the transaction activity may include monitoring a total number of items scanned by a point-of-sale device during a period of time. Monitoring the transaction activity may include monitoring a total number of transactions processed by the POS device per unit of time. Processing a transaction may include providing a transaction service to a TP.

The method may include imposing a second surcharge at a second checkout lane. The second surcharge may be imposed at the second checkout lane when transaction activity at the first checkout lane exceeds a pre-determined threshold. The first surcharge may be greater than the second surcharge. The pre-determined threshold may be a rate at which transactions are processed by the POS device.

When transaction activity at the first checkout lane is below the pre-determined threshold, the method may include imposing the first surcharge at the second checkout lane.

The first checkout lane may be manned by a human operator. The second checkout lane may be unmanned. The second checkout lane may be an automated or self-serve check-out lane.

In some embodiments, a surcharge discount or waiver may be offered to customers that checkout using a mobile device. The customer may scan items or present payment instrument information using the mobile device. A self-service checkout lane may include performing a checkout process using a customer's personal mobile device. Apparatus may include a system for managing a checkout queue. The system may include a point-of-sale ("POS") controller. The POS controller may be located at a POS or any other suitable location. The POS controller may be a central server. The POS controller may control a POS terminal. The POS controller may control a network of POS terminals. The network of POS terminals may include POS terminals at different merchant locations.

A POS terminal may be positioned at a checkout counter. The POS terminal may present purchase information to a customer. The purchase information may include one or more transaction attributes. The POS terminal may present surcharge information to the customer. The surcharge information may include one or more surcharge attributes. The POS terminal may receive payment information from a customer. The payment information may include one or more transaction attributes. The payment information may include one or more payment instrument attributes. Illustrative payment instrument attributes are shown below in table 6.

TABLE 6

Illustrative payment instrument attributes
Illustrative Payment Instrument Attributes Brand (i.e., issuer, transaction network, acquirer)
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Affinity code
Product (i.e., rewards card, platinum card, signature card, ect.)

The POS controller may be configured to determine a surcharge. The POS controller may be configured to impose the surcharge on a transaction. The POS controller may transmit one or more surcharge attributes to a POS terminal.

The POS controller may determine a surcharge based on information received from a POS terminal. The POS controller may determine a surcharge for a specific POS terminal. The POS controller may determine a surcharge for a plurality of POS terminals.

The POS controller may determine a first surcharge for a first POS terminal. The POS controller may impose the first surcharge on transactions that are processed at the first POS terminal. The POS controller may detect a change in a performance metric. The change in the performance metric may be monitored during the time period. The POS controller may determine if the change in the performance metric exceeds a threshold value.

The performance metric may be any suitable performance metric. Table 7 lists illustrative performance metrics.

TABLE 7

Illustrative performance metrics.
Illustrative Performance Metrics

Checkout queue length
Items scanned per minute
Transaction processing rate
Ingress rate into merchant location
Egress rate out of merchant location
Time between ingress and egress
Number of items purchased per transaction
Transaction volume (number)
Transaction volume ($)
Transaction frequency (per item/per unit of time)
Transaction frequency (per sale/per unit of time)
Total sales
Sales per fiscal period
Number of credit card purchases
Number of non-credit card purchases
Number of items purchased
Cost/price per item purchased
Same store sales
Customer characteristics The performance metric may be affected by the surcharge imposed by the POS controller. A change in the performance metric may correspond to an effect of the surcharge on the performance metric. The effect of the surcharge may be an effect on one or more of the transaction participants. The effect of the surcharge may be an effect on one or more suitable parties. The parties may be third parties to a transaction. The effect may be an effect on profitability. The effect on profitability may include a change in transaction volume, revenue, gross/net profit, number of items sold or any suitable indicator of profitability.

The effect of the surcharge may be an effect on efficiency of a TP. For example, the surcharge may affect how long a customer may wait on a checkout queue before being able to leave a location with a purchased product.

The effect of the surcharge may correspond to a change in a purchasing behavior of the customer. For example, if a surcharge is imposed on credit card transactions, the customer may avoid using a credit card to pay for a purchase. If the surcharge is imposed at a merchant location associated with a merchant category code ("MCC"), the customer may avoid making a purchase at the merchant location associated with the MCC. The customer may increase use of alternative payment instruments that are not associated with the surcharge or are associated with a lower surcharge.

Illustrative performance metrics and illustrative performance metric effects are shown below in Table 8.

TABLE 8

Illustrative performance metrics and effects.

| Performance Metric | Performance Effect |
|---|---|
| Transaction volume | Rate of change |
| | Daily volume |
| | Volume per item |
| | Volume at specified time |
| | Volume at specified locations |
| | Number of items sold per transaction |
| Revenue | Daily/hourly revenue |
| | Quarterly earnings |
| | Profit per item sold |
| | Profit per transaction |
| | Surcharge revenue |
| | Cash revenue |
| Transaction cost | Change in acquirer fees |
| | Change in network fees |
| | Change in issuer fees |
| | Change in transaction cost per item |
| | Average transaction cost per transaction |
| | Loss of goodwill (i.e., volume of customer complaints) |
| | Change in number of transactions authorized/denied |
| | Change in surcharge implementation costs |
| Checkout queue length | Items scanned per unit of time |
| | Customer ingress rate |
| | Customer egress rate |
| | Transaction processed per unit of time |
| | Checkout lane availability |

The change in the performance metric may be detected by comparing a first performance metric quantity to a second performance metric quantity. The first performance metric quantity and the second performance metric quantity may be each associated with the performance metric.

The methods may include receiving a plurality of performance metric quantities. Each of the plurality of performance metric quantities may correspond to an effect of one or more surcharge attributes on the performance metric.

The system may monitor a change in a first performance metric during the time period. The computer may monitor a change in a second performance metric during the time period.

A performance metric may be a queue performance metric ("QPM"). The QPM may include one or more features of a performance metric. The QPM may correspond to a length of a checkout queue. The QPM may correspond to a time a customer spends waiting on a line before completing a checkout process. A surcharge may affect the QPM. A surcharge may be determined based on a QPM.

The POS controller may determine a surcharge for a second POS terminal. The POS controller may impose the second surcharge on a transaction processed at a second POS terminal. The POS controller may impose the second surcharge at the second POS terminal when the change in a QPM exceeds the threshold value.

For example, a POS controller may measure a rate of items scanned at a first checkout lane. The POS controller may detect an increase in the rate of items scanned at the first checkout lane. The increase in the rate of items scanned may correspond to an increase in a number of customers utilizing the first checkout lane. A rate of items scanned that exceeds a threshold rate may correspond to customers waiting to be processed at the first checkout lane.

The POS controller may monitor a rate of items scanned at a second checkout lane. The rate at the second lane may be less than the rate at the first lane. The lower rate of items scanned at the second checkout lane may correspond to fewer customers utilizing the second checkout lane. To motivate customers to utilize the second checkout lane, the POS controller may waive a surcharge imposed on transactions if a customer utilizes the second checkout lane.

The first POS terminal and the second POS terminal may be nodes on a network of POS terminals. The first POS terminal and the second POS terminal may be located at the same address. The address may be a street address, a GPS coordinate or any suitable identifying characteristic of a location. The first POS terminal and the second POS terminal may be located at different addresses.

The POS controller may be further configured to transmit an attribute of the second surcharge to a display. The attribute of the second surcharge attribute may be transmitted to the display when a change in a QPM exceeds a pre-defined threshold.

A change in a QPM may exceed a threshold value at a first time. The POS controller may be configured to apply the second surcharge at the second POS terminal at a second time. The second time may be later than the first time. A duration between the first time and the second time may correspond to a surcharge notice time.

The surcharge notice time may correspond to a period of time during which an intent to "turn on" the surcharge is communicated. The intent may be communicated to the customer, a transaction participant or any suitable party. The intent may be communicated via electronic signage, text messaging, email or in any suitable mode of communication.

The notice time may provide a "buffer" of time before imposing a surcharge. The buffer may reduce a risk that a customer entering a merchant location will be unaware of the imposed surcharge. The merchant location may be an online portal of the merchant.

The notice time may be determined based on one or more performance metrics. A performance metric may correspond to a QPM. The notice time may be determined based on a QPM. The notice time may be determined based on a change in a QPM. The notice time may be determined based on an effect of the surcharge on the QPM. The effect of the surcharge may be measured by a change in a quantity associated with a QPM.

Imposing the surcharge without communicating the intent may damage goodwill of a transaction participant. Illustrative transaction participant types are shown above in Table 3.

For example, the performance metric may correspond to how frequently a "regular" customer makes a purchase at a merchant location. Statistically, the "regular" customer may make a purchase at the merchant location once a week.

The merchant may determine that if the intent to impose the surcharge is not provided at least one week prior to the start time, the "regular" customer may be unaware of the surcharge at the start time. Imposing the surcharge without prior communication of the intent to impose the surcharge may result in damage to goodwill of the merchant. Damage to the goodwill may correspond to the effect of the surcharge. Damage to the goodwill may correspond to the "regular" customer curtailing future purchases from the merchant. Damage to the goodwill may correspond to one or more performance metric quantities falling below a performance metric threshold.

As a further example, the surcharge may be imposed on a payment instrument associated with the issuer. An imposition of the surcharge without adequate notice prior to the start time may result in the customer curtailing use of the payment instrument.

The notice time may be determined based on one or more surcharge regulations. The regulations may govern imposition of the surcharge. The regulations may govern the recovery amount. The regulations may include legislative and/or government agency action. The regulations may include an agreement between transaction participants. For example, an agreement between transaction participants may allow imposition of the surcharge only if transaction participants are notified of the intent to impose the surcharge at least thirty days prior the start time.

The notice time may be determined based on a threat of legislative and/or government action in response to surcharge activity.

The POS controller may be configured to receive transactions from a plurality of manned POS terminals. The QPM may be associated with one of the plurality of manned POS terminals.

For example, a high rate of items scanned per unit of time may indicate that a manned POS terminal is being heavily used. To alleviate the load of a clerk operating the POS terminal, the surcharge imposed at the manned POS terminal may be adjusted. To alleviate the load of a clerk operating the POS terminal, the surcharge imposed at an unmanned POS terminal may be adjusted.

The queue performance metric may correspond to a length of a customer queue waiting to use the first POS terminal. For example, the POS controller may detect that a high rate of items scanned per unit of time is sustained for ten minutes. The POS controller may determine that a long checkout queue may be present at the POS terminal used to scan the items.

As a further example, a sensor mounted at or near an entranceway to a merchant location may detect a number of customers entering the merchant location. A sensor mounted at an exit from a merchant location may detect a number of customers exiting the merchant location. The POS controller may detect a difference between the rate of entry to a merchant location and the rate of exit from the merchant location. The POS controller may determine a time differential between the rate of entry and the rate of exit.

Based on a detected difference between the rate of entry and the rate of exit, the POS controller may determine an amount of time that a customer may spend inside the merchant location. If the time spent inside the merchant location exceeds a threshold, the POS controller may determine that a long checkout queue is preventing the customer from timely exiting the merchant location.

Apparatus may include a system for managing a checkout queue. The system may include a first sensor. The first sensor may be configured to monitor customers entering a merchant location. The system may include a second sensor. The second sensor may be configured to monitor customers exiting the merchant location.

The system may include a point-of-sale ("POS") controller. The POS controller may be configured to determine a first rate of customers entering the merchant location. The POS controller may determine the first rate based on the number of customers detected by the first sensor. The merchant location may be a checkout lane.

The POS controller may be configured to determine a second rate of customers exiting the merchant location. The POS controller may be configured to determine an adjustment to a current surcharge imposed at the merchant location. The POS controller may determine the adjustment based on the first rate and/or the second rate.

The merchant location may include a plurality of POS terminals. The POS controller may be configured to apply the adjustment at a subset of the plurality of POS terminals. The subset may correspond to one or more self-serve POS terminals. The adjustment may correspond to a decrease in a surcharge that is being imposed at a manned POS terminal. By lowering the surcharge imposed at the self-serve POS terminal, a merchant may attempt to encourage customers to use the self-serve terminals. If more customers utilize the self-serve POS terminals to checkout, the rate of customers exiting the merchant location may increase. If more customers utilize the self-serve POS terminals to checkout, the customers may spend less time waiting on a checkout queue.

The POS controller may be configured to determine the adjustment based on attaining a target second rate within a pre-determined time period. The target second rate may correspond to a target rate of customers exiting the merchant location.

The POS controller may be configured to determine a queue time. The POS controller may determine the queue time based on a difference between the first rate and the second rate. The POS controller may account for an amount of time attributable to activities other than waiting on line. The POS controller may determine the adjustment based on attaining a target queue time. The POS controller may determine the adjustment based on attaining a target time within a pre-determined time period. The adjustment may correspond to a decrease in a current surcharge imposed at the merchant location.

For example, the POS controller may be configured to detect that a customer may be required to wait seven minutes to complete a checkout process if a manned POS terminal is used. The POS controller may also be configured to determine that if more customers utilize one of a bank of self-serve POS terminals, the wait time at the manned POS terminals may be reduced to four minutes.

To incentivize customers to utilize the bank of self-serve POS terminals, the POS controller may transmit a surcharge notice to customers. The surcharge notice may inform the customers that no surcharge will be imposed at the bank of self-serve terminals. The offer of "surcharge free" transactions may motivate customers to utilize the bank of self-serve terminals, and reduce the wait time for customers that still wish to use the manned POS terminals.

The POS controller may be configured to apply the adjustment when a customer purchases a threshold number of items. A merchant may wish to encourage customers to purchase a threshold number of items. To incentivize customers, the merchant may offer a reduced surcharge transaction or a zero surcharge transaction if a customer purchases a requisite number of items.

The merchant may associate a special surcharge with a specific item. For example, the merchant may advertise that a particular item, if purchased together a total of five items, triggers a zero surcharge transaction. The POS controller may be configured to implement the offer. The POS controller may detect a total number of items purchased by a customer. The POS controller may detect if the special item is included among a total of five items.

Transaction Cost Recovery Inventory Management

Apparatus may include an article of manufacture comprising a non-transitory computer usable medium. The non-transitory medium may include computer readable program code embodied therein. The program code when executed by a processor may cause a computer to determine a surcharge adjustment.

The computer readable program code may cause the computer to detect a rate of change in an inventory level. The inventory may correspond to salable inventory. The inventory may correspond to inventory that the merchant wishes to retain for a time period. The inventory may correspond to inventory that the merchant wishes to sell by a particular time. The inventory may correspond to inventory associated with a specific profit margin.

For example, a merchant may desire to promote sales of a high profit item. To promote the sale of the high profit item, the merchant may offer a surcharge discount associated with a purchase of the high profit item.

The inventory level may correspond to a number of items included in the inventory. Each item may be identified by a stock keeping unit identifier (hereinafter, "SKU"). The inventory level may correspond to a total number of products available to be sold by the merchant. The total number of products may include products that share an identical SKU. The total number of products may include products that are associated with a plurality of SKUs.

The computer readable program code may cause the computer to determine a surcharge adjustment. The surcharge adjustment may be based on a rate of change in the inventory level. The computer readable program code may cause the computer to apply the surcharge adjustment to a current surcharge. The surcharge adjustment may be applied after a threshold rate of change is detected. The surcharge adjustment may be applied after or upon expiration of a notice-time associated with the surcharge.

For example, a POS controller may detect a decrease in a total number of widgets available for sale. The POS controller may determine that if the inventory of widgets continues to decrease at the current rate, the inventory may decrease to a critical level. If the inventory level reaches or alternatively drops below, the critical level, the merchant may be unable to replenish the inventory of widgets fast enough to meet customer demand for the widgets.

To prevent the inventory of widgets from reaching the critical level, the merchant may associate a surcharge with a purchase of a widget. The merchant may impose the surcharge on purchases of the widget when the POS controller detects a threshold rate of change in the inventory level that indicates that the inventory is on a trajectory to reach, or fall below, the critical level. The trajectory may forecast an end result corresponding to an inventory level at or below a critical level or other suitable target inventory level.

The surcharge may be an item by item surcharge. The item by item surcharge may be a surcharge imposed on a specific item. The surcharge amount may be determined based on a price of the item. The surcharge may not be imposed on other items purchased in a single transaction together with the specific item.

For example, a merchant may impose a surcharge on item "X." The merchant may wish to curtail sales of item "X." If a customer purchases items "X," "Y" and "Z," a surcharge may be imposed on the purchase of item "X." The surcharge may not be imposed on the purchase of items "Y" and "Z." The purchase of items "Y" and "Z" may be subject to a surcharge different from the surcharge imposed on the purchase of item "X."

A surcharge may be imposed based on a "born on" time of an item. The born on time may correspond to a time when the item is registered as being part of an inventory. A surcharge may be imposed to remove "stale" items from inventory. For example, a POS controller may be configured to waive a surcharge if an item purchased is associated with a born on time earlier than a threshold time. The surcharge may be imposed on an item by item basis. The surcharge may fluctuate based on a difference between the born on time and the threshold time.

When the threshold rate of change is detected, the POS controller may transmit a surcharge notice. The surcharge notice may be displayed at one or more merchant locations. The surcharge notice may inform customers that beginning at a specified time a surcharge specified in the surcharge notice will be imposed on a purchase that includes a widget.

The specified surcharge may be greater than a surcharge currently imposed at the one or more merchant locations. When the rate of change in the inventory level corresponds to a decrease per unit time in the inventory level, the surcharge adjustment may correspond to an increase in the current surcharge.

The surcharge adjustment may correspond to a difference between a surcharge currently imposed at one or more merchant locations and a surcharge specified in the surcharge notice. When a rate of change in the inventory level corresponds to an increase in the inventory level, a surcharge adjustment may correspond to a decrease in a current surcharge imposed on transactions.

For example, a merchant may wish to avoid a cost of storing excess inventory. To avoid the cost of storing excess inventory, the merchant may wish to maintain a target inventory level or a target inventory window—i.e., between a first, lower, level and second, higher, level. The merchant may detect that a product is not selling as well as anticipated. Lackluster sales of the product may result is a change in the inventory level associated with the product. The change may correspond to an inventory level above the target level.

To bring the inventory level below the target level, the merchant may offer a promotion to improve sales of the product. The promotion may include a "surcharge free" transaction if a purchase includes the product. The surcharge adjustment may correspond to a reduction in a surcharge currently imposed on transactions at the one or more merchant locations.

The program code may cause the computer to apply a surcharge adjustment to the current surcharge. The surcharge adjustment may be applied to the current surcharge at a POS terminal. The surcharge adjustment may be applied when the POS terminal detects at least one item having a SKU corresponding to particular product.

A rate of change in an inventory level may be a first rate of change. The program code may cause the computer to maintain a current surcharge until a second rate of change in the inventory level is detected. The second rate of change may confirm that the change in the inventory level corresponds to a pre-determined trajectory.

Apparatus may include an article of manufacture comprising a non-transitory computer usable medium having computer readable program code embodied therein for causing a computer to impose a surcharge on a transaction.

The computer readable program code may cause the computer to monitor a demand for a product. The demand for the product may correspond to a number of the products sold during a pre-determined period of time.

The computer readable program code may cause the computer to monitor a salable inventory level of the product. The salable inventory level may be correlated to the demand. For example, a correlation may be determined by showing that if demand remains strong, the inventory level may reach a critical level.

The computer readable program code may cause the computer to determine a surcharge based on the demand and the salable inventory level. The surcharge may be determined based on the correlation. The computer readable program code may cause the computer to determine the surcharge based on a requirement to maintain a sufficient inventory level to service the demand. The requirement may correspond to maintaining sufficient inventory so that the inventory level does not reach a critical level.

The computer readable program code may cause the computer to impose the surcharge on a transaction. The surcharge may be imposed on a transaction when a demand for a product may result in an inventory level associated with the product reaching a critical level.

The computer readable program code may cause the computer to determine a surcharge based on effecting a change in the demand. The change may correspond to increasing the demand. The change may correspond to decreasing the demand.

The computer readable program code may cause the computer to determine a surcharge based on maintaining a target inventory level. The computer readable program code may cause the computer to determine the surcharge based on maintaining a target inventory level associated with the target change.

For example, a merchant may wish to improve sales of a product. To stimulate sales, the merchant may waive or reduce a surcharge imposed on a purchase of the product. The computer readable program code may impose the surcharge on a transaction when: (1) a measured level of demand indicates that an inventory level corresponding to a product is on a trajectory to increase above a target level, and (2) the transaction includes a purchase of the product.

The program code may cause the computer to determine a surcharge based on a number of products purchased in a single transaction. For example, the merchant may wish to prevent an inventory from being depleted to a critical level. The merchant may impose a first surcharge on a purchase of a single product that reduces the inventory. The merchant may impose a second surcharge on a purchase that includes a purchase of multiple products, each purchase of the multiple products contributing to a reduction in the inventory. The second surcharge may be greater than the first surcharge.

The surcharge may include a first surcharge and a second surcharge. The first surcharge may be imposed when a first number of the product is purchased. The first number may be greater than the second number. The second surcharge may be imposed when a second number of the product is purchased. The first surcharge may be greater in magnitude than the second surcharge.

For example, if a customer purchases three products that reduce an inventory, the merchant may impose a surcharge that is greater on a per product basis than if the customer purchased a single product. In other words, the customer may be penalized for purchasing "too many" of the product.

Apparatus may include an inventory management system. The system may include an inventory controller. The inventory controller may be configured to detect a first change in a number of products available for sale. The number of products available for sale may correspond to an inventory level. The inventory controller may be configured to determine a surcharge based on the detected change.

The system may include a digital display. The digital display may be configured to receive a surcharge notice from the inventory controller. The digital display may be configured to present the surcharge notice at a merchant location.

The system may include a POS controller. The POS controller may be configured to impose the surcharge.

The inventory controller may be configured to detect a second change in the number of products available for sale. The POS controller may be configured to impose the surcharge in response to the second change. The POS controller may be configured to impose the surcharge after or upon expiration of a notice time.

The surcharge may correspond to an increase in a current surcharge imposed by the POS controller. The surcharge may correspond to a decrease in a current surcharge imposed by the POS controller. The inventory controller may determine that increasing the current surcharge may prevent the number of products from being depleted down to a critical level. The inventory controller may determine that decreasing the current surcharge may stimulate sales of a product. Additional sales of the product may prevent a number of products in an inventory from exceeding a target number.

Transaction Cost Recovery Discount Offering

Apparatus may include one or more non-transitory computer-readable media storing computer-executable instructions. The instructions, when executed by a processor on a computer system, perform a method for directing customer point-of-sale ("POS") traffic.

The methods may include receiving a transaction record from a first POS terminal at a first merchant location. The method may include determining a first classification based on one or more transaction attributes of the transaction record. For example, the transaction record may include an attribute corresponding to a description of an item purchased. The transaction record may include a transaction attribute corresponding to a merchant category code ("MCC").

The merchant category code may classify a merchant based on a primary line of business. For example, the merchant may be assigned the MCC based on whether the merchant provides predominately goods or provides predominately services. If a merchant provides both goods and services, the MCC assigned to the merchant may correspond to the greater portion of the merchant's business.

The MCC may classify the merchant based on a market segment serviced by the merchant. Exemplary MCCs and associated market segments are shown in Table 9.

TABLE 9

Illustrative MCCs and associated market segments.

| Illustrative Merchant Category Code ("MCC") | Illustrative Associated Market Segment |
| --- | --- |
| 0742 | Veterinary Services |
| 4214 | Motor Freight Carriers and Trucking - Local and Long Distance, Moving and Storage |

TABLE 9-continued

Illustrative MCCs and associated market segments.

| Illustrative Merchant Category Code ("MCC") | Illustrative Associated Market Segment |
| --- | --- |
| | Companies, and Local Delivery Services |
| 4812 | Telecommunication Equipment and Telephone Sales |
| 5047 | Medical, Dental, Ophthalmic, and Hospital Equipment and Supplies |
| 5172 | Petroleum and Petroleum Products |
| 5718 | Fireplace, Fireplace Screens, and Accessories Stores |

The MCC may be associated with a taxation status. For example, if the MCC corresponds to a provider of services, a customer that purchases services from the merchant may not be required to report payments for the services to a government agency.

The MCC may be assigned by the acquirer. The acquirer may assign the MCC to the merchant at a time the merchant agrees to accept the payment instrument as a form of payment. The acquirer may assign the MCC to the merchant in response to the merchant agreeing to accept the payment instrument as a form of payment.

The merchant may be assigned multiple MCCs. For example, the merchant may provide pharmacy products and grocery products. The pharmacy products may be assigned a first MCC and the grocery products may be assigned a second MCC.

The MCC may be a transaction attribute. For example, the merchant may provide predominately pharmacy products at a first location and predominately grocery products at a second location. A transaction that occurs at the first location may be associated with the first MCC. A transaction that occurs at the second location may be associated with the second MCC.

As a further example, the merchant may house a pharmacy and a grocery at a single address. The pharmacy may be associated with a first checkout location and the grocery may be associated with a second checkout location. Purchases made at the first location may be associated with the first MCC and purchases made at the second location may be associated with the second MCC. A MCC may indicate that a first merchant sells goods or services corresponding to a first classification.

The method may include identifying a second classification. The second classification may be genre-related to the first classification. The second classification may be geographically-related to the first classification. The second classification may include a second merchant or a plurality of second merchants. The second merchant may be geographically proximal to the first merchant. The second merchant may sell products genre-related to products sold by the first merchant.

For example, a customer may purchase cheese at a specialty store. Upon detection of the cheese purchase, the method may categorize the cheese purchase as belonging to a first classification. The first classification may be based on the MCC value corresponding to the specialty store. The method may include identifying a second classification that is related to the cheese purchase. The second classification may include a wine or liquor merchant. The wine merchant may be genre-related to the cheese merchant. The relationship may be based on a pre-determined relationship between "wine" and "cheese." A customer that purchases cheese at a specialty store may be likely to purchase wine to drink with the cheese.

As further example, a customer may purchase an airline ticket. Upon detection of a first MCC code corresponding to "airlines," the method may identify a second MCC that is genre-related to the first MCC. For example, the second MCC may correspond to an MCC associated with hotels or restaurants.

The second classification may include one or more wine merchants that are geographically-related to the specialty cheese merchant which is included in the first classification. A geographic location of a merchant may be identified based on a transaction attribute corresponding to a geographic value. For example, the second classification may include wine merchants that are located within a radius of the specialty cheese merchant. The geographic relationship may be based on GPS coordinates of merchants, a zip code, an area code or any suitable geographic indicator.

The second classification may include a plurality of merchants. At least one of the plurality of merchants may be identified as the second merchant. The method may include identifying the second merchant based on a surcharge behavior of a merchant. For example, a non-surcharging merchant may be selected over a surcharging merchant.

The plurality of merchants included in the second classification may all supply products associated with the second classification. At least one of the plurality of merchants may be identified as the second merchant if the merchant does not impose a surcharge. The second merchant may be identified based on whether a merchant included in the second classification imposes a surcharge that is relatively less than the surcharge imposed by other merchants in the second classification.

Identifying a second classification may include identifying a plurality of stored transaction records. The plurality of transaction records may include a range of temporal values. Each transaction record may include a transaction attribute corresponding to a temporal value. The plurality of transaction records may correspond to purchases made at a plurality of merchants. The plurality of transaction records may include a threshold number of purchases made at each of a plurality of merchants during the range of temporal values.

A received transaction record may include a transaction attribute corresponding to a temporal value. The temporal value may be a transaction attribute. The temporal value may correspond to a time when a customer executes a transaction or makes a purchase. The purchase may have occurred at a first merchant. The temporal range may include a plurality of temporal values corresponding to times prior to the temporal value in the received transaction record. The temporal range may include a plurality of temporal values corresponding to times later than the temporal value in the received transaction record.

For example, the range of temporal values may correspond to transactions executed within one hour either before or after the temporal value included in the received transaction record. The range may be any suitable range.

The range of temporal values may be determined based on a travel time. For example, the range of temporal values may correspond to a distance. A range of temporal values corresponding to fifteen minutes may represent a travel time between a first merchant and a second merchant. The travel time may correspond to a travel time between a customer location and a merchant location. The customer location may be a billing address. The customer location may be determined based on a location of a mobile device. The mobile device may be in possession of the customer.

The range of temporal values may correspond to a customer behavior. A customer may shop at the second merchant within fifteen minutes of making a purchase at the first merchant. The range of temporal values may correspond to a time of day. For example, a customer may shop at the first merchant during morning hours and shop at the second merchant during afternoon hours. The range of temporal values may correspond to morning hours. The range of temporal values may correspond to afternoon hours.

The temporal range may be determined based on a purchasing behavior pattern specific to a particular customer or a group of customers. Locations and times of a customer's purchases may be monitored. The locations and times may be monitored based on one or more transaction attributes. Based on the monitored locations and times, a purchasing pattern may be identified. For example, a pattern may show that a customer buys a coffee between 7 AM and 8 AM, buys a sandwich between 12 PM and 2 PM and picks up dry cleaning once a week between 6 PM and 7 PM.

The temporal range may be determined based on a purchasing behavior of a population sample. For example, the population sample may exhibit purchasing behavior that occurs during a time period. The range of temporal values may be determined based on purchasing behavior associated with a specific transaction attribute or any suitable purchasing behavior.

A second classification may be identified based on a threshold number or a "cluster" of transaction records associated with a plurality of merchants. For example, each merchant included in the plurality of merchants may conduct a threshold number of transactions within a temporal range. The threshold number of transaction may be "clustered" within the temporal range. The threshold number of transactions may correspond to a threshold number of customers shopping at each of the plurality of merchants. The threshold number of transactions may indicate that during the temporal range is an appropriate time to shop at each of the plurality of merchants.

A temporal value included in a received transaction record may be within the range of temporal values associated with the plurality of transaction records. The received transaction record may be associated with the plurality of stored transaction records. The association may be based on the temporal value in the received transaction record being within the range of temporal values.

The temporal range may identify at least one second classification. The second classification may be genre-related to a first classification. Each of the plurality of stored transaction records that include a temporal value within the range temporal values may also include a transaction attribute corresponding to a MCC value. At least one of the plurality of MCC values included in the plurality of stored transaction records may be different from a MCC value included in the received record.

The MCC value in the received transaction record may be associated with at least one MCC value included in the plurality of stored transaction records. The at least one MCC value may be different from the MCC value included in the received transaction record. The at least one MCC value identified in the plurality of transaction records may be the second classification.

For example, when a customer makes a first purchase at a first merchant, a plurality of transaction records may correspond to second purchases made at a plurality of second merchants not more than fifteen minutes travel from a location of a first purchase. The plurality of second merchants may each be associated with a MCC different from a MCC of the first merchant. Each of the MCCs may correspond to a second classification.

A second merchant may be identified based on whether a merchant included in the second classification imposes a surcharge that negatively affects a performance metric of a TP. For example, a merchant that imposes a surcharge that reduces interchange revenue of another TP may not be identified as the second merchant.

The method may include determining whether to identify the second merchant based on a surcharge behavior of the first merchant. For example, if the first merchant does not impose a surcharge, customers of the first merchant may be eligible to receive a special offer.

A surcharge behavior of a merchant may correspond to an imposition of a surcharge. The surcharge behavior may correspond to a surcharge schedule. The surcharge schedule may be implemented by a merchant. The merchant may impose the surcharge schedule on customers that shop at one or more merchant locations. The one or more merchant locations may be "brick and mortar" locations, online locations, mobile locations or any suitable location.

The surcharge schedule may include imposing the surcharge at a designated time. The schedule may include defining a price of a product if payment is made by credit card. The schedule may indicate a "turn on" time and a "turn off" time associated with the surcharge. The merchant may "turn on" a surcharge during morning hours, "turn off" the surcharge during afternoon hours and "turn on" the surcharge during evening hours.

The method may include transmitting a surcharge notice to the customer. The surcharge notice may be issued by the second merchant. The method may include transmitting the surcharge notice to the POS terminal at the first merchant. For example, the surcharge notice may be printed on a receipt issued to the customer by the first merchant.

The surcharge notice may inform a customer of a surcharge currently being imposed by the second merchant. The surcharge notice may include a special offer available at the second merchant. For example, the special offer may include a promotion being offered by the second merchant. The promotion may include a reduced or waived surcharge for holders of the special offer.

The special offer may be based on a transaction attribute of the transaction record received from the first merchant. For example, the customer may make a purchase at the first merchant using a payment instrument. The special offer may include a reduced surcharge if the customer makes a purchase at the second merchant using the same payment instrument used at the first merchant.

Apparatus may include a transaction controller. The transaction controller may include a non-transitory computer usable medium having computer readable program code embodied therein. The code when executed by a processor may cause the transaction controller to determine an inter-merchant proximity.

The computer readable program code may cause the transaction controller to identify a first plurality of transaction records associated with a first merchant. The computer readable program code may cause the transaction controller to identify a second plurality of transaction records associated with a second merchant.

The computer readable program code may cause the transaction controller to determine the inter-merchant proximity between the first merchant and the second merchant. The inter-merchant proximity may be based on a time difference. The time difference may correspond to a temporal range between a purchase made at a first merchant and a purchase made at a second merchant.

A first range of temporal values may be associated with a first plurality of transaction records. Each of the transaction records included in the first plurality may be associated with a temporal value within the first range. Each of the transaction records included in the first plurality may be associated with a first merchant. The first plurality of transaction records may correspond to a threshold number or a "cluster" of purchases made at the first merchant.

A second range of temporal values may be associated with a second plurality of transaction records. Each of the transaction records included in the second plurality may be associated with a temporal value within the second range. Each of the transaction records included in the second plurality may be associated with a second merchant. The second plurality of transaction records may correspond to a threshold number or a "cluster" of purchases made at the second merchant.

The inter-merchant proximity may be based on a difference between the first range of temporal values and the second range of temporal values. For example, the first range of temporal values associated with the first plurality of transaction records may indicate that a first threshold number of transactions occurred at a first merchant between 10 AM and 11 AM on Tuesday. The second range of temporal values associated with a second plurality of transaction records may indicate that a second threshold number of transaction occurred at a second merchant either between 8 AM and 9 AM on Tuesday or between 10:30 AM and 11:30 AM on Tuesday.

Based on a difference between the first range and the second range, the transaction controller may determine the inter-merchant proximity. The inter-merchant proximity may indicate that a purchase at the first merchant may be associated with a purchase at the second merchant. The inter-merchant proximity may indicate that a threshold number of purchases at the first merchant may be associated with a threshold number of purchases at the second merchant.

The inter-merchant proximity may be determined based on one temporal value included in a first range of temporal values, and one temporal value included in a second range of temporal values. A inter-merchant proximity may indicate that purchases at the second merchant may overlap in time with purchases made at the second merchant. In the example above, a portion of a threshold number of purchases occur at both the first and second merchants between 10:30 AM and 11 AM. The inter-merchant proximity between the first temporal range and the second temporal range may be zero.

A threshold number of purchases may occur at the second merchant within an inter-merchant proximity of a threshold number of purchases made at the first merchant. In the example above, a threshold number of purchases may occur at the second merchant between 8 AM and 9 AM and a threshold number of purchases may occur at the first merchant between 10:20 AM and 11:30 AM. The inter-merchant proximity may be determined based on an end of a first range and a beginning of a second range. The inter-merchant proximity between the second merchant and the first merchant may be two hours.

Based on the first and second temporal ranges, the transaction controller may determine that when a threshold number of purchases occur at the first merchant, a threshold number of purchases may occur at the second merchant within an inter-merchant proximity. More specifically, in the example above, purchases at the first and second merchant may likely occur within two hours of each other. The inter-merchant proximity may correspond to the time it takes to travel (and/or shop) between a first location and a second location.

The computer readable program code may cause the transaction controller to transmit a surcharge notice. The computer readable program code may cause the transaction controller to transmit a surcharge notice. The surcharge notice may be associated with the second merchant.

The computer readable program code may cause the transaction controller to transmit the surcharge notice when an inter-merchant proximity is less than a threshold proximity. An inter-merchant proximity that is shorter than a threshold proximity may correspond to a period of time and/or a distance. For example, the time may be correlated to a travel time between a first location and a second location. The inter-merchant proximity may indicate that a purchase may occur at both the first and second merchant within a threshold time period and/or a threshold distance.

The computer readable program code may cause the transaction controller to transmit the surcharge notice at a temporal value corresponding to one temporal value within a range of temporal values. The one temporal value may correspond to beginning of a temporal range. The one temporal value may correspond to an end of a temporal range. The one temporal value may correspond to any temporal value within a temporal range. The range of temporal values may correspond to the first range of temporal values. The range of temporal values may correspond to the second range of temporal values.

A temporal value may be any suitable indicator of time. A temporal value may be specified with any suitable degree of precision. For example, a temporal value may correspond to hours such 8:00. The temporal value may correspond to hours, minutes and seconds, such as 8:15:23. The temporal value may correspond to hours, day of the week, month and year.

When a customer makes a purchase at the first merchant at a time corresponding to a temporal value within the first temporal range, the customer may receive a surcharge notice issued by the second merchant. The customer may receive the surcharge notice if an inter-merchant proximity between the first merchant and the second merchant is less than a threshold proximity. The customer may receive the surcharge notice a period of time after making the purchase at the first merchant. The period of time may correspond to a difference between a first range of temporal values and a second range of temporal values. The period of time may correspond to an inter-merchant proximity.

The surcharge notice may be associated with the second merchant. The surcharge notice may be associated with the first merchant. The surcharge notice may include a surcharge imposed by the second merchant. The surcharge notice may include a surcharge imposed by the first merchant.

The surcharge notice may include a coupon. The coupon may offer the customer a promotion available at the first merchant or the second merchant. The promotion may be a surcharge discount. The surcharge notice may include a surcharge discount offered by the second merchant. The surcharge notice may include a surcharge discount offered by the first merchant.

The promotion may be dependent on the inter-merchant proximity. For example, if an inter-merchant proximity is fifteen minutes, the promotion may include a pricing discount greater in magnitude than if the time difference between the time values is thirty minutes.

When the inter-merchant proximity is less than a threshold proximity, a customer may make a second purchase at a second merchant. The inter-merchant proximity may correspond to a second merchant that is geographically close to the first merchant. The promotion may encourage a customer to travel to the second merchant and make a purchase at the second merchant.

The surcharge notice may remain valid for a period of time corresponding to the inter-merchant proximity. The surcharge notice may remain valid until an end of a temporal range. For example, the surcharge notice may remain valid until an end of a temporal range associated with the plurality of transaction of the second merchant. The surcharge notice may remain valid for any suitable time period.

The promotion may be dependent on a time the customer makes the purchase. For example, if the customer makes the purchase at a time that is close to an end of a range of temporal values, the promotion may include a zero surcharge on a future purchase. If the customer makes the purchase at a time that is thirty minutes prior to and end of a range of temporal values, the promotion may include a discounted surcharge on a future purchase, but may not include the more lucrative offer of a zero surcharge on a future purchase.

The coupon may include an expiration time. After or at the expiration time the coupon may be ineffective. The expiration time may be less than or equal to an average time value. The average time value may correspond to an average time between a first purchase at a first merchant and a second purchase at a second merchant. The average time value may correspond to an average inter-merchant proximity.

The computer readable program code may cause the transaction controller to determine an inter-merchant proximity based on a first range of geographic values associated with a first plurality of transaction records. The computer readable program code may cause the transaction controller to determine the inter-merchant proximity based on a second range of geographic value associated with a second plurality of transaction records.

For example, each of the first plurality of transaction records may include a transaction attribute corresponding to a geographic value. The plurality of geographic values may represent a plurality of first merchant locations. Each of the second plurality of transaction records may include a transaction attribute corresponding to a second geographic location. The plurality of geographic values may represent a plurality of second merchant locations.

The computer readable program code may cause the transaction controller to determine the inter-merchant proximity based on a difference between the first range of geographic values associated with the first plurality of transaction records and a second range of geographic values associated with the second plurality of transaction records. The difference between the first range and the second range may correspond to a threshold distance.

The threshold distance may correspond to a typical distance a customer travels between a first merchant and a second merchant. For example, a customer may travel one mile between a grocery and a dry cleaners. The customer may travel five miles between a grocery and a veterinarian.

As a further example, a merchant may deploy sales agents at a location. The location may be a trade show, an entertainment event political rally or other temporary venues. The sales agents may process transactions at the temporary venue using mobile devices. The merchant may offer special or promotional pricing scheme at the temporary venue.

The promotional pricing may include no surcharging at the temporary venue or at locations with a range of the venue. A promotion may be sent to each customer that makes a purchase within a range of the temporary venue. The promotion may be exercised at one or more merchant locations within a range of the temporary venue. The promotion may be exercised during a temporal range. The temporal range may correspond to a duration of the temporary venue.

If a first merchant location is within a threshold distance of a second merchant location, the customer may receive a surcharge notice. The surcharge notice may include a promotion offered by the second merchant. The customer may be close to the second merchant and may be prompted by the promotion to make a purchase at the second merchant.

A difference between a temporal range and/or a geographic range may be a minimum difference, a maximum difference, an average difference or any suitable difference.

The computer readable program code may cause the transaction controller to transmit the surcharge notice based on a surcharge behavior exhibited by the first merchant. The computer readable program code may cause the transaction controller to determine the inter-merchant proximity based on a surcharge behavior exhibited by the second merchant.

For example, if the second merchant imposes a surcharge that conforms to a set of surcharge rules, the transaction controller may be configured to transmit a surcharge notice on behalf of the second merchant. The The set of surcharge rules may include one or more surcharge rules. A surcharge rule may be any requirement imposed on a transaction. The surcharge rule may be any rule that effects a determination of one or more surcharge attributes. The surcharge rule may be set by a TP or a third party such as a federal or state government.

Apparatus may include a point-of-sale ("POS") controller. The POS controller may process a transaction at a point-of-sale. The terminal may include a non-transitory computer usable medium. The computer readable medium may include computer readable program code embodied therein. The code when executed by a processor may cause the POS controller to identify a special offer. The computer readable instructions may configure the POS controller.

The POS controller may be configured to receive a transaction record. The POS controller may identify a first merchant category code ("MCC") associated with the transaction record. The POS controller may determine a second MCC associated with the first MCC. The second MCC may correspond to a MCC that is genre-related to the first MCC. The second MCC may correspond to a MCC that is geographically-related to the first MCC.

The POS controller may identify a merchant location associated with the second MCC. The merchant location may offer products described by the second MCC. The POS controller may transmit a special offer available at the merchant location.

The POS controller may identify a merchant location that is within a threshold distance of a geographic value. The geographic value may be a transaction attribute. The transaction attribute may be associated with the merchant associated with the first MCC. For example, the merchant location may be located within a half-mile of the geographic value in the received transaction record.

The geographic values in a plurality of stored transaction records may be used to identify the merchant location. The geographic values may identify merchant locations within a pre-determined range of a current customer location. The current customer location may be determined based on a location of a mobile device. The mobile device may be in possession of the customer.

The POS controller may be configured to receive a plurality of stored transaction records. The POS controller may receive the plurality of transaction records from a plurality of POS terminals. Each transaction record may include one or more transaction attributes. A transaction attribute may correspond to a MCC value.

The POS controller may identify a purchasing pattern among the plurality of stored transaction records. The pattern may correlate the first MCC to the second MCC. The pattern may correlate a first transaction attribute to a second transaction attribute.

For example, the pattern may indicate that when a customer makes a purchase at a first merchant, the customer is likely to make a purchase at a second merchant. The pattern may indicate that if the customer makes a first purchase from a first merchant, the customer will likely make a second purchase from a second merchant that is located within a radius of the first merchant. The pattern may indicate that if the customer makes a first purchase from a first merchant, the customer will likely make a second purchase from a second merchant within a threshold time period.

The first merchant may be associated with a threshold number of transactions. Each of the threshold number of transactions that occur at the first merchant may be associated with a corresponding transaction at the second merchant. A time period between each pair of transactions may correspond to a range of temporal values. The range of temporal values may correspond to a threshold distance and/or a threshold time period.

The pattern may be determined using any suitable technique. For example, a first temporal or geographic value may be linearly, or non-linearly, regressed upon a second temporal or geographic value, modeled on the second time value, predicted from the second time value or estimated from the second time value. The correlation may be determined utilizing a multivariate statistical model or a neural network. Determining the correlation may include determining a correlation coefficient that indicates a degree of correlation between two sets of data.

The POS controller may identify the merchant location based on a surcharge behavior associated with the second location. For example, a TP such as an issuer or a transaction processing network may provide a transaction service to a merchant that includes transmitting a surcharge notice to a potential customer of the merchant. The potential customer may be identified by the TP based on a previous transaction conducted by the customer at a different merchant. The potential customer may be identified based on a pattern identified in a plurality of transaction records. The plurality of transaction records may be historical transaction records.

The special offer may include a surcharge notice. The surcharge notice may inform a potential customer of a current surcharge imposed by a merchant. The surcharge notice may inform a potential customer of an intent of a merchant to impose a surcharge. The surcharge notice may include a date and time when the merchant intends to impose the surcharge. The surcharge notice may include a merchant location where the surcharge is imposed.

The special offer may include an offer to purchase a product associated with the second MCC at a reduced surcharge. The special offer may indicate a merchant location where the product may be purchased.

The special offer may identify a merchant location that does not impose a surcharge. The special offer may identify a merchant location that imposes a surcharge relatively less than a surcharge imposed at another merchant location.

The POS controller may be configured to transmit a travel path from a current location to the merchant location. For example, the special offer may include directions to a merchant location where the customer may take advantage of the special offer. The surcharge notice may include directions to a merchant location that does not impose a surcharge.

The POS controller may identify a payment instrument held by a customer. The payment instrument may be identified based on a transaction attribute in a transaction record. The POS controller may receive the transaction record. The POS controller may transmit a special offer based on the payment instrument held by the customer.

For example, the POS controller may transmit a special offer that is keyed to a payment instrument previously used by a customer. The special offer may include a discount on a future purchase if the customer uses the payment instrument to pay for the future purchase.

The special offer may be determined based on relationship between a first merchant and a second merchant. For example, the POS controller may determine that when a customer makes a first purchase at a first merchant, the customer is likely to make a second purchase at a second merchant if the second merchant is located within one mile of the first merchant. The POS controller may transmit a special offer, redeemable at the second merchant and keyed to the payment instrument used at the first merchant.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
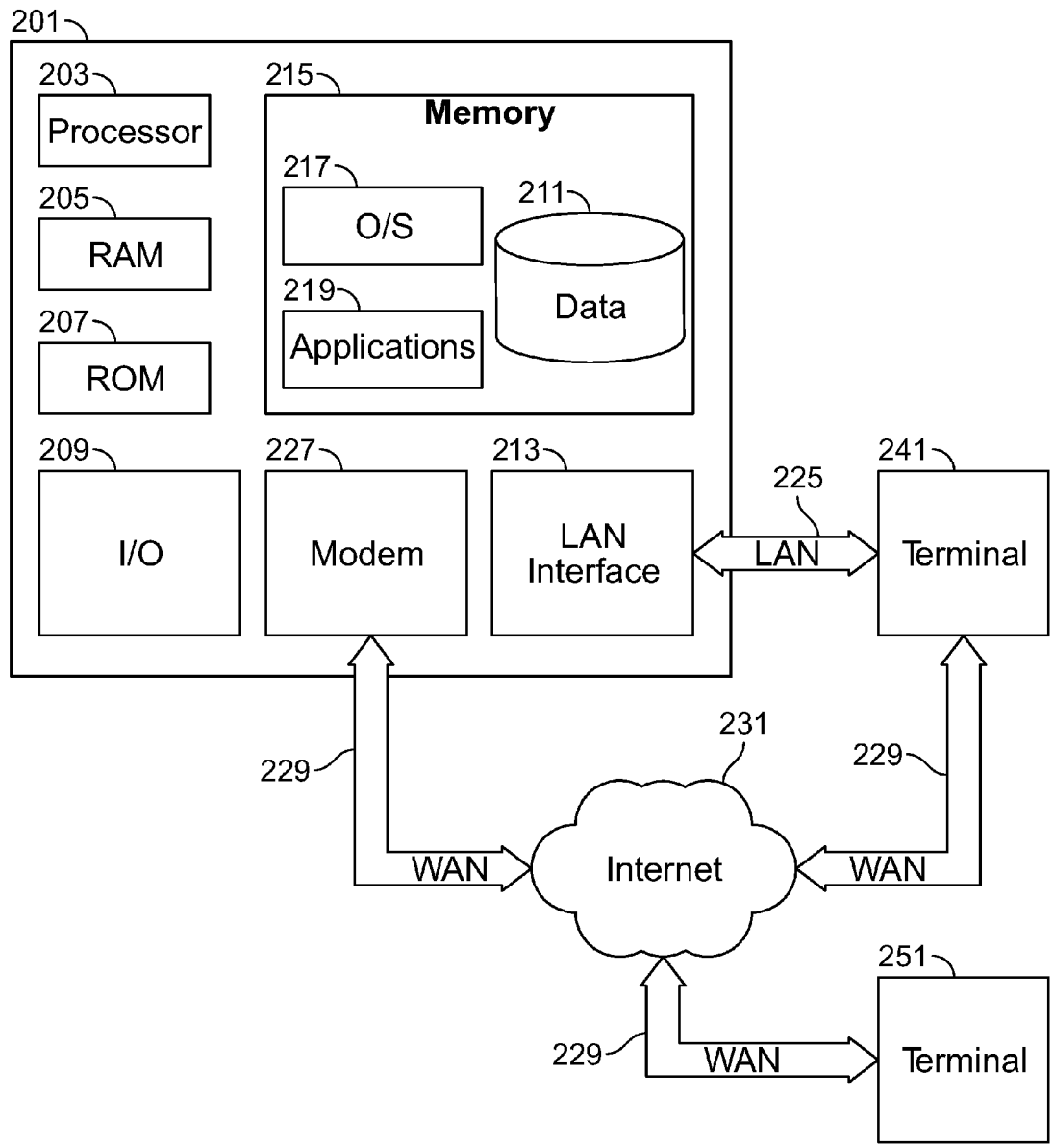
FIG. 2 shows illustrative apparatus in accordance with the principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215. Server 201 may include one or more receiver modules, server modules and processors that may be configured to receive transaction records, apply surcharge rules, identify surcharge violations, compare values, establish correlations and perform any other suitable tasks related to determining the transaction cost.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown). As described in detail below, database 211 may provide storage for customer information, transaction cost information, transaction records, transaction attributes, surcharge records, inter-merchant proximities, inventory level thresholds, merchant information, surcharge rules, payment instrument information and any other suitable information.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service ("SMS"), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, smart phone, tablet, or any other suitable device for storing, transmitting and/or transporting relevant information.

Any information described above in connection with database 211, and any other suitable information, may be stored in memory 215.

One or more of applications 219 may include one or more algorithms that may be used to receive transaction records, identify surcharge violations, apply surcharge rules, determine inter-merchant proximities, detect inventory levels and perform any other suitable tasks related to determining a transaction cost.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, tablets, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 3:
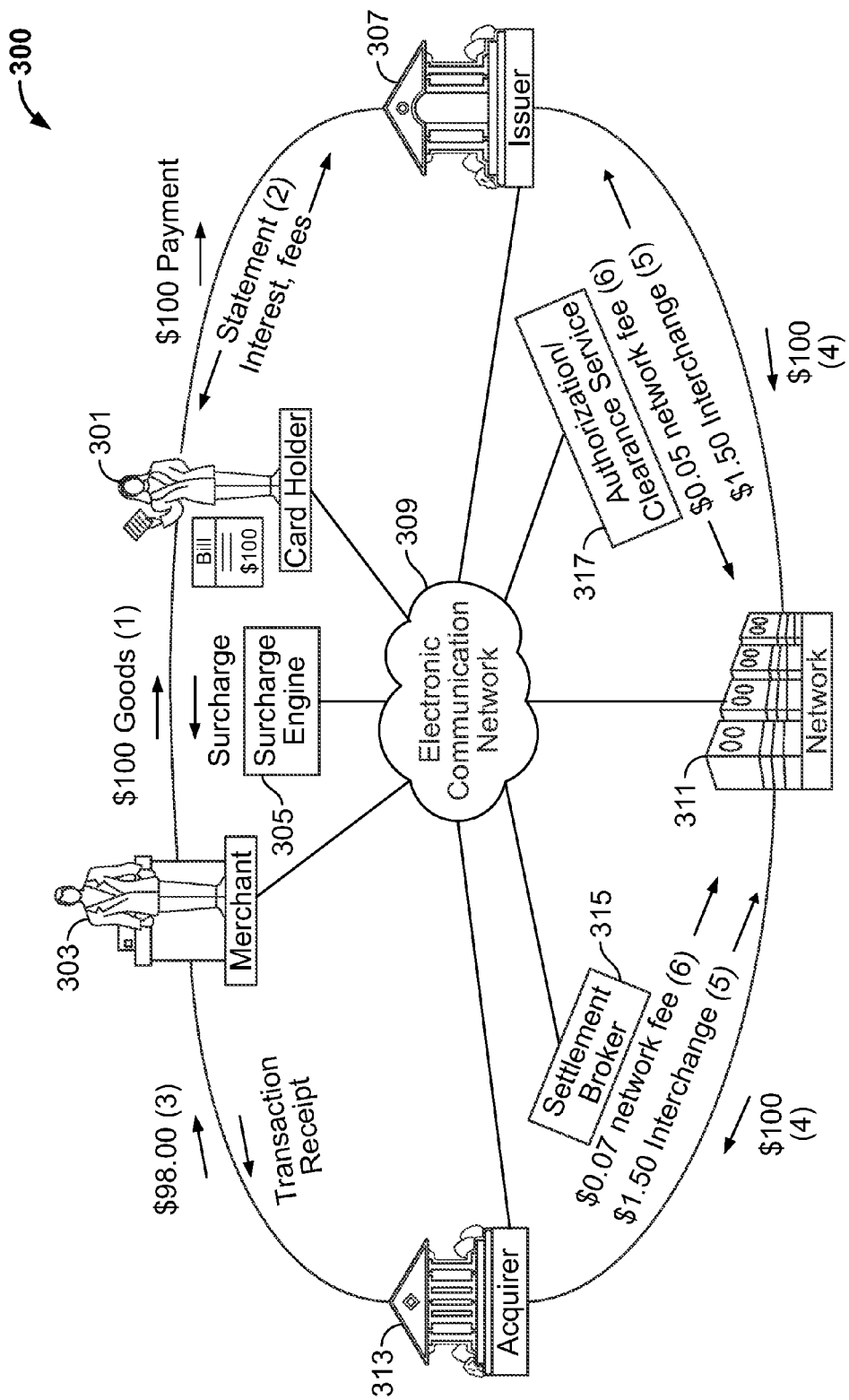
FIG. 3 shows an arrangement in which apparatus and methods in accordance with the principles of the invention may be used.

FIG. 3 shows illustrative credit card transaction settlement flow 300.

At step 1 card holder 301 may offer a payment instrument, such as a credit card, as payment for $100 of goods sold by merchant 303. Card holder 301 may present information associated with the credit card at the merchant's point-of-sale terminal (not shown). The information may be presented via the payment instrument, a loyalty card or any other suitable device or method.

Based on the information presented by card holder 301, surcharge engine 305 may determine an offset amount. The surcharge engine may determine one or more surcharge attributes. The offset amount may be based on the surcharge fraction.

The offset amount may be added to the $100 price charged by merchant 303. The $100 price may include the offset amount. A total amount may be determined. The total amount may include the price, offset amount, sales tax and any other suitable costs associated with the purchase of the goods.

The information presented by card holder 301, may be transmitted via electronic communication network 309 to transaction network 311. The information may include a transaction record.

Transaction network 311 may receive the information presented by card holder 301 via electronic network 309. Based on the received information, transaction network 311 may transmit an authorization, via electronic communication network 309, to merchant 303. Transaction network 311 may communicate with issuer 307. Transaction network 311 may verify that card holder 301 has not exceeded a credit limit associated with the payment instrument. The authorization may include an indication that the transaction network has approved a charge of the total amount to an account associated with the payment instrument. Authorization services may be provided by a third party such as a transaction broker.

Card holder 301 may acknowledge the total amount. The acknowledgement may include an agreement by card holder 301 to place the charge on the account associated with the payment instrument. The acknowledgement may include a commitment by the card holder to pay the total amount to issuer 307.

At step 2, issuer 307 may prepare a statement for card holder 301. The statement may include the total amount owed to issuer 307. The statement may include interest or other fees owed to issuer 307. Issuer 307 may bear an expense of collecting the total amount, interest and fees from card holder 301. A portion of the transaction cost may flow to issuer 307 to fund collection efforts of issuer 307 and offset a risk of default of card holder 301.

At step 3, merchant 303 may present the acknowledgment of card holder 301 and/or the associated authorization by transaction network 311 to acquirer 313. Acquirer 313 may transfer funds to merchant 303 prior to actual collection, by issuer 307, of the total amount from card holder 301. Acquirer 313 may offer funds to merchant 303 prior to settlement between acquirer 313 and issuer 307.

Acquirer 313 may deduct a merchant discount from an amount of funds transferred to merchant 303. The offset amount determined by surcharge engine 305 may offset, at least in part, the merchant discount paid by merchant 303. The offset amount may correspond to transaction costs charged by transaction network 311. The offset amount may include transaction costs charged by acquirer 313 and issuer 307.

In flow 300, the merchant discount is 2% of the $100 price. Without an offset, merchant 303 receives $98 of the $100 price.

At step 4, acquirer 313 settles the transaction with issuer 307. Acquirer 313 may utilize transaction network 311 to settle the transaction. Acquirer 313 may utilize broker 315 to settle the transaction. Broker 315 may offer settlement services at a lower transaction cost than transaction network 311. Broker 315 may offer the lower transaction costs as a result of aggregating transactions from different acquirers. Each of the aggregated transactions may require settlement between issuer 307 and acquirer 313.

Step 4 shows that at least a portion of the merchant discount flows through transaction network 311 from acquirer 313 to issuer 307. Step 4 also shows that transaction network 311 may receive a network fee from acquirer 313. Step 4 also shows that transaction network 311 receives a network fee from issuer 307. Acquirer 313 and issuer 307 may pay transaction network 311 network fees for facilitating settlement of the transaction.

Table 10 shows net positions of the parties to flow 300.

TABLE 10

Net positions.

| Party | Net ($) |
| --- | --- |
| Issuer | 1.45 |
| Acquirer | 0.43 |
| Network | 0.12 |
| Merchant | 0 |
| Customer | −2.00 |

Table 11 shows benefits of flow 300 to the transaction participants.

TABLE 11

Illustrative benefits of each transaction participant.

| Party | Benefit |
| --- | --- |
| Merchant | Access to card holder funds and credit |
| | Timely settlement |
| | Protection from customer fraud and credit risk |
| | Increased purchase price amounts |
| | Payment guaranteed |
| Issuer | Reliable payment platform with broad acceptance |
| | Consistent customer experience across merchants |
| | Predictable source of revenue to support card issuance costs |
| Card holder | Access to ready funds and credit |

TABLE 11-continued

Illustrative benefits of each transaction participant.

| Party | Benefit |
| --- | --- |
| Transaction Broker | Ability to make purchases virtually anywhere
Protection from fraud
Protection from merchant disputes
Reward for card based purchases
Does not need to carry cash
Revenue from trading transaction processing bids
Reliable routing platform
Reducing transaction processing overhead
Access to consumers and suppliers of transaction services |

Figure 4:
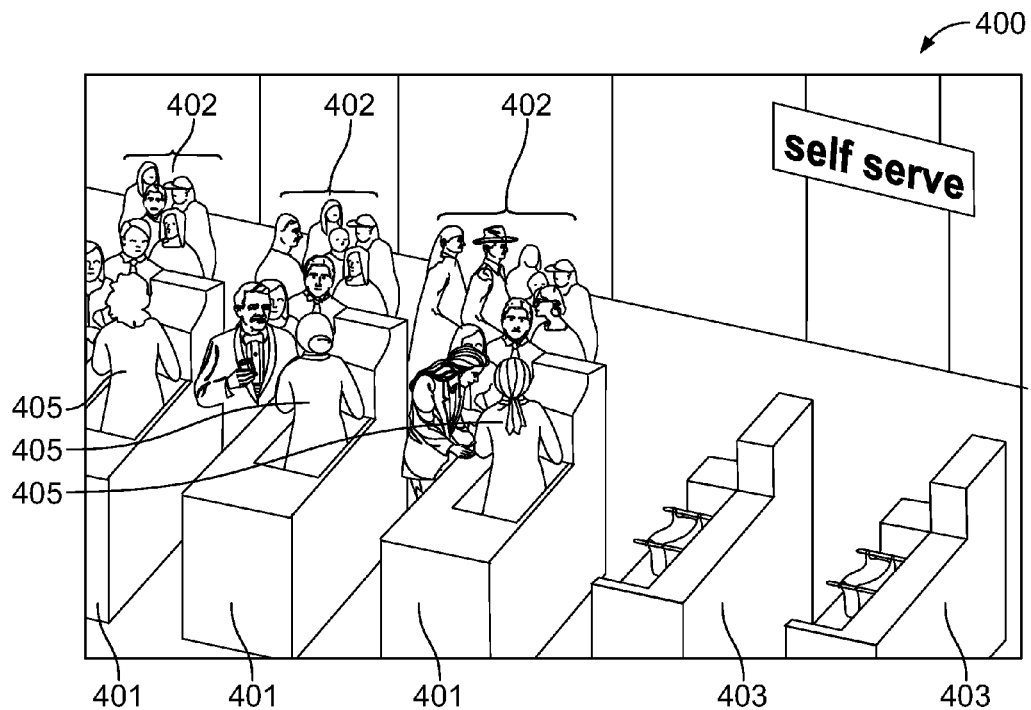
FIGS. 4-5 show illustrative scenarios in accordance with the principles of the invention.
Figure 5:
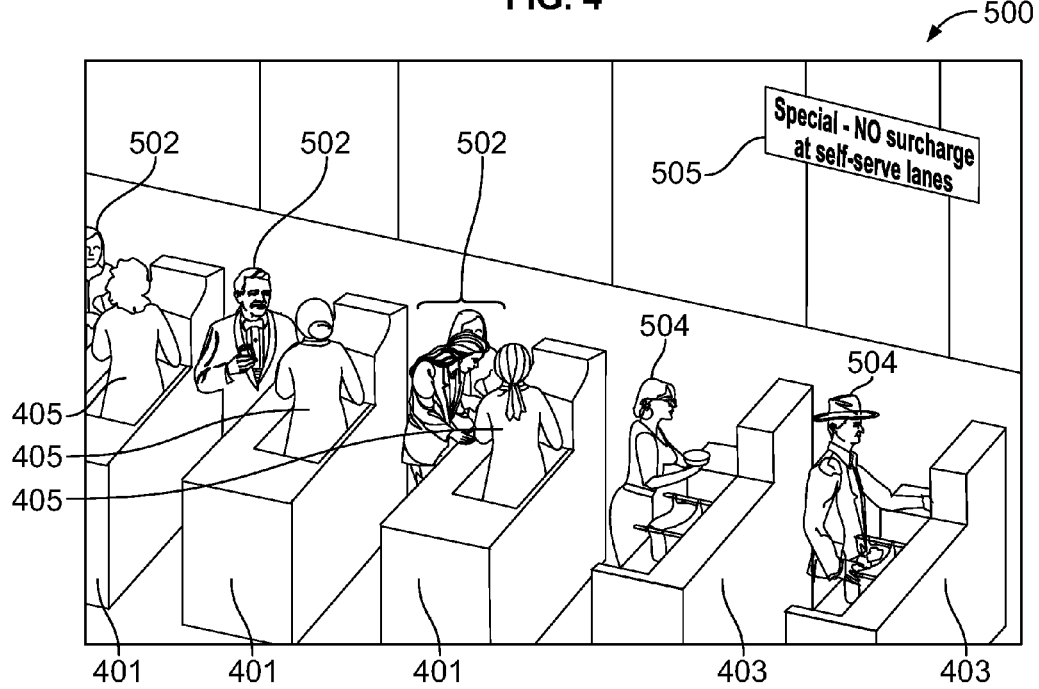

FIG. 4 shows illustrative scenario 400. In scenario 400 customers 402 are forming lines at checkout lanes 401. Checkout lanes 401 are manned checkout counters. At checkout counters 401, customers 402 will be served by one of clerks 405. Scenario 400 shows that there are no customers waiting to use automated self-serve checkout lanes 403. Scenario 400 also shows that customers 402 must wait on line before being served by one of clerks 405.

FIG. 500 shows illustrative scenario 500. In scenario 500 a special promotion is displayed by sign 505. Sign 505 indicates that no surcharge will be charged at self-serve checkout lanes 403.

Scenario 500 shows customers 502 being served by clerks 405. Scenario 500 also shows customers 504 using self-serve checkout lanes 403. In scenario 500 customers 502 are not waiting on line to be served by clerks 405. Some of customers 402 (shown in FIG. 4) that had been waiting on line to be served by clerks 405 may be motivated to take advantage of the special promotion and utilize self-serve lanes 403. Customers 504 that utilize self-serve checkout lanes 504 may reduce a wait time to be served by clerks 405.

Figure 6:
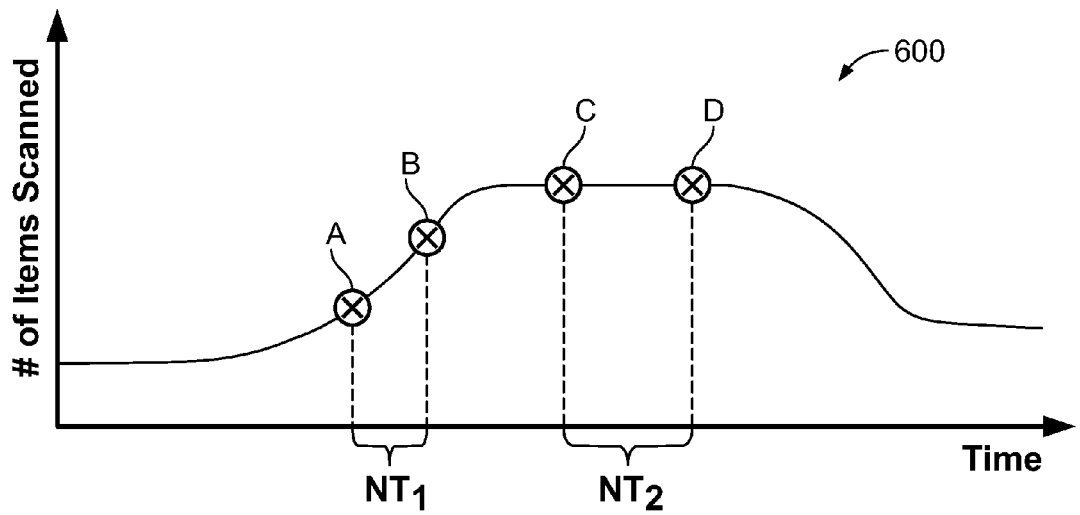
FIG. 6 shows illustrative information in accordance with the principles of the invention.

FIG. 6 shows illustrative information 600. Information 600 includes a graphical representation of a number of items scanned by a POS terminal versus time. The number of items scanned may correspond to a number of items scanned during a unit of time. For example, the number of items scanned may correspond to a number of items scanned in one minute.

Point A may correspond to a threshold wait time at a manned checkout lane. Point A may correspond to a checkout clerk servicing customers with a brief break in between customers. If the number of items scanned increases to point B, the clerk may be servicing customers one after the other without a break in between. If the number of items scanned increases above point B, customers may need to wait on line before being served by a clerk.

To avoid customers waiting on line, upon detection of point A, a surcharge notice may be displayed at merchant location. The surcharge notice may inform customers that after passage of a notice time, a surcharge will be waived at the merchant location if customers use a self-serve checkout lane. A merchant may waive the surcharge at the self-serve checkout lanes to encourage customers to utilize the self-serve lanes.

If customers utilize the self-serve checkout lanes, other customers may not need to wait on line to be served at manned checkout lanes. Based on historical monitoring, a merchant may determine that when the number of items scanned corresponds to point A, the number of items scanned will likely increase to a point correspond to a customer having to wait on line. Based on historical monitoring, a merchant may determine that when the number of items scanned corresponds to point A, the merchant has sufficient time to display a surcharge notice for a notice time.

The notice time may be required by one or more surcharge rules. The notice time may provide customers sufficient time to decide whether to utilize a self-serve checkout lane or a manned checkout lane. Information 600 shows that the notice time $NT_1$ corresponds to a time during which the number of items scanned will increase from point A to point B. The merchant may wish to being offering a special surcharge at point B to avoid the number of items scanned, and a corresponding wait time, from increasing beyond a threshold level.

Information 600 also shows that at point C, the number of items scanned is unchanging. At point C the merchant may transmit another surcharge notice. The surcharge notice may inform customers that after notice time $NT_2$ a surcharge may increase. After notice time $NT_2$, the merchant may increase the surcharge imposed at the self-serve checkout lanes. The merchant may increase the surcharge as a result of fewer customers entering a merchant location than at point A. When fewer customers enter the merchant location, it may be less likely that a customer will need to wait on a line to checkout.

The merchant may transmit a surcharge notice at point C based on historical analysis indicating that if the increased surcharge imposed by point D, the surcharge will be imposed just prior to when the number of items scanned begins to decrease. The decrease in the number of items scanned may correspond to fewer customers entering a merchant location, and less of a risk that a customer will have to wait on line to checkout.

Figure 7:
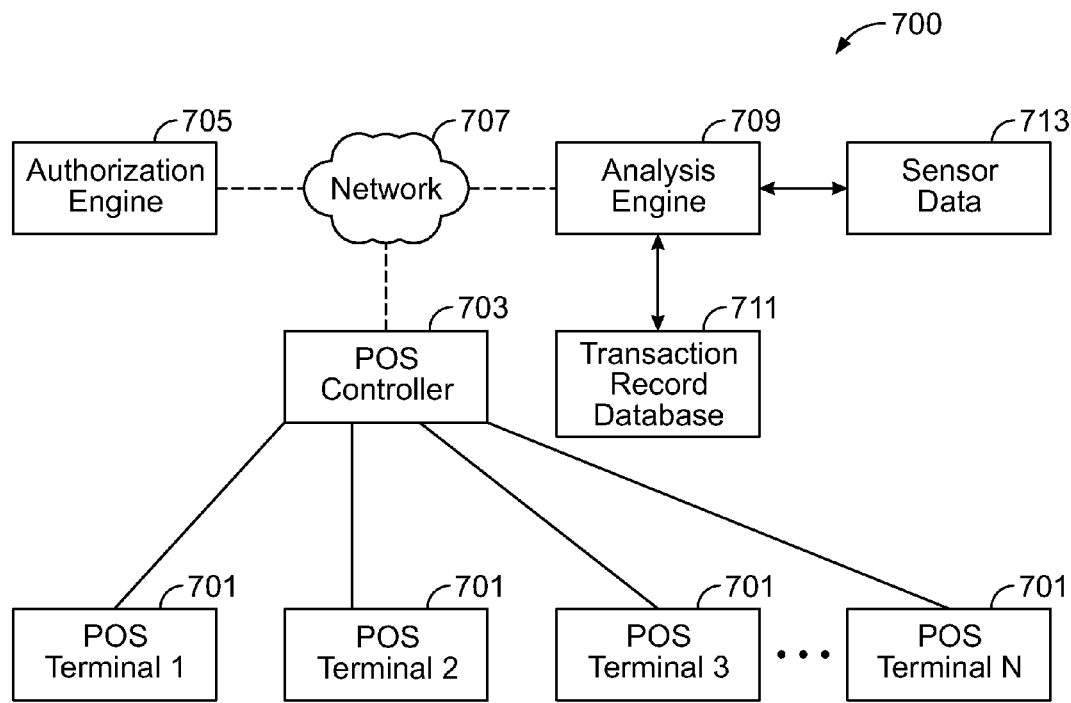
FIG. 7 shows illustrative apparatus in accordance with the principles of the invention.

FIG. 7 shows illustrative system 700. System 700 includes POS controller 703. POS controller 703 may receive transaction information from POS terminals 701. A customer may purchase goods by transferring customer information from a personal data storage device, such as a credit card, to POS terminal 701. POS terminal 701 may read the customer information from the card. The customer information may include issuer information, account information and any other suitable information.

POS terminal 701 may have one or more interactive features that a customer may use. The features may provide the customer with information that may help the customer decide whether to execute the transaction. The customer may use the features to obtain more information about the merchant, the transaction, the surcharge, transaction fees associated with different payment instruments (e.g., credit cards, debit cards, instruments or devices that include a contact chip, such as an ISO14443-compliant contactless chip, or other electronic purchasing devices) or other suitable information. Payment instruments may store data in a magnetic strip, a bar code, a silicon chip or any other suitable data storage device or format.

POS controller 703 may act as a server for providing user prompts and display layout information to one or more POS terminals such as POS terminal 701. POS controller 701 may receive transaction information from one or more of the POS terminals 701. For example, POS controller 705 may receive item scan information from POS terminals 701. The item scan information may include a number of items scanned by the POS terminal during a period of time.

The transaction information received from POS terminals 701 may include any suitable transaction attribute. Illustrative transaction attributes are shown above in table 5. The transaction information may include a transaction record. POS controller 703 may receive a transaction record from POS terminals 701. POS controller 703 may transmit the transaction record to network 707.

Network 707 may route transaction information to analysis engine 709. Analysis engine 709 may obtain information from transaction record database 711 and sensor data 713. Analysis engine 709 may determine whether or not to change a surcharge attribute. For example, analysis engine 709 may be configured to identify points A-D (shown in FIG. 6). Analysis engine 709 may identify patterns in transaction record database 711. The patterns may include an inter-merchant proximity. Analysis engine 707 may determine a surcharge based on the inter-merchant proximity.

Sensor data 713 may include a number of customers entering or exiting a merchant location. The number of customers entering or exiting the merchant location may be detecting using one or more sensors (not shown) deployed at the merchant location.

Network 707 may route transaction information to authorization engine 705. Routing to authorization engine 705 may be governed by the transaction information. For example, the routing may be governed by a bank issuer number ("BIN") that is encoded in the customer's credit card. Authorization engine 705 may render a transaction authorization decision based on the transaction information.

Authorization engine 705 may transmit authorization information back to POS terminal 701 through network 707 and POS controller 703. The authorization information may include an authorization decision (e.g., "GRANTED" or "DENIED").

POS controller 705 may transmit surcharge information to POS terminals 701. The surcharge information may include any suitable surcharge attribute. Illustrative surcharge attributes are shown above in table 5.

Figures 8, 9:
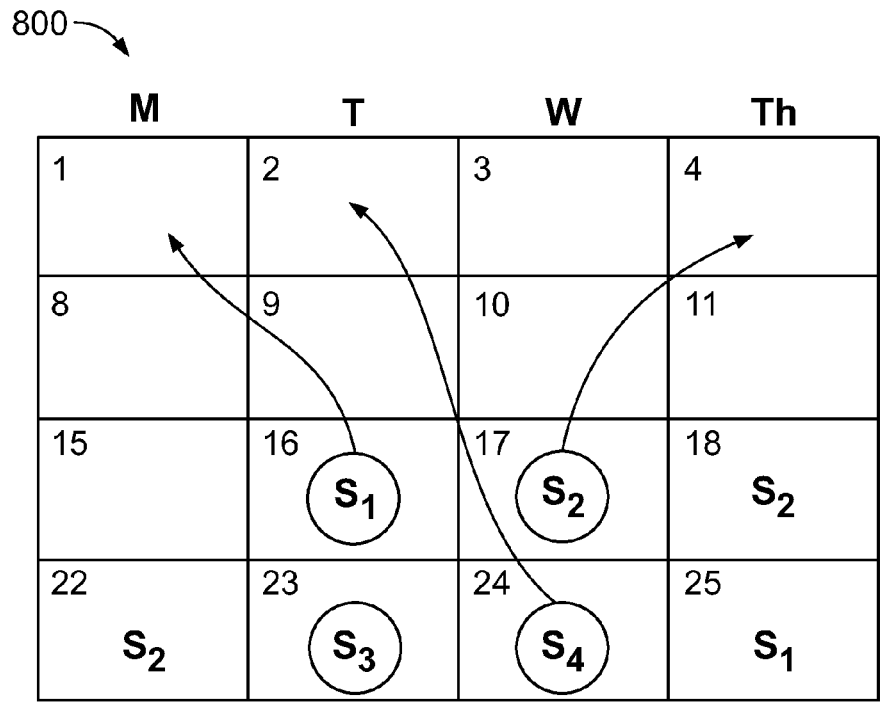
FIG. 8-9 show illustrative information in accordance with the principles of the invention.

FIG. 8 shows illustrative surcharge schedule 800. Schedule 800 shows surcharges S1-S4. Each surcharge is associated with a weekday.

Schedule 800 shows that surcharge S1 is scheduled to be imposed on Tuesday the 16th. Schedule 800 also shows that surcharge S1 is associated with a notice time of Monday the 1st. On Monday the 1st, one or more surcharge attributes associated with surcharge S1 may be presented on one or more displays. The notice time associated with S1 corresponds to nine weekdays, exclusive of Fridays, Saturdays and Sundays.

Schedule 800 shows that surcharge S2 is scheduled to be imposed on Wednesday the $17^{th}$ and is associated with a notice time of Thursday the $4^{th}$. On Thursday the $4^{th}$, one or more surcharge attributes associated with surcharge S2 may be presented on one or more displays. The notice time associated with S2 corresponds to seven weekdays, exclusive of Fridays, Saturdays and Sundays.

Schedule 800 shows that surcharge S3 is scheduled to be imposed on Tuesday the $23^{rd}$ and is not associated with a notice time earlier than the day the surcharge is imposed. On Tuesday the $23^{rd}$, one or more surcharge attributes associated with surcharge S3 may be presented on one or more displays. S3 may correspond to a reduction of surcharges S1 and/or S2.

Schedule 800 shows that surcharge S4 is scheduled to be imposed on Wednesday the $24^{th}$ and is associated with a more surcharge attributes associated with surcharge S4 may be presented on one or more displays. The notice time associated with S4 corresponds to thirteen weekdays, exclusive of Fridays, Saturdays and Sundays.

FIG. 9 shows illustrative surcharge notice 900. Surcharge notice 900 may present surcharge information. The surcharge information may include payment instrument brands 903, surcharge 905 and surcharge exceptions 907.

Surcharge notice 900 includes four exemplary brands 903. A payment instrument may be associated with one or more of the four brands 903. A brand may correspond to an issuer of the payment instrument. A brand may correspond to a transaction network affiliated with the payment instrument. Each brand is associated with a surcharge 905.

For example, Bank 2 is associated with a first surcharge and a second surcharge. The first surcharge includes a surcharge fraction of $\frac{1}{100}$. The first surcharge is imposed on all purchases. The second surcharge includes the surcharge fraction and a fixed amount of 50¢. The second surcharge is imposed on purchases valued less than $10.

Surcharge notice 900 indicates that each brand 903 may be associated with a surcharge exception 907. The surcharge exception 907 may indicate that, under certain conditions, a payment instrument may be exempt from the surcharge. For example, surcharge notice 900 shows that payment instruments issued by Bank 2 are exempt from the surcharge if the payment instrument is associated with Transaction Network T. Transaction Network T may be the transaction network that processes transactions associated with payment instruments issued by Bank 2.

Figure 10:
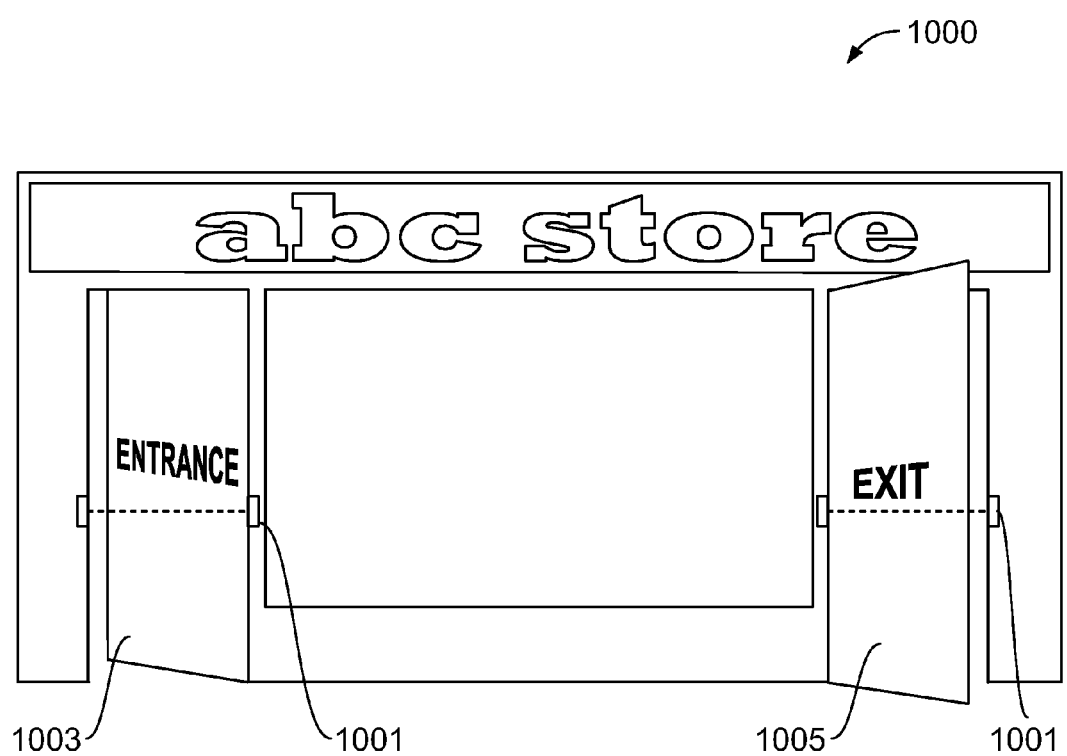
FIG. 10 shows illustrative apparatus in accordance with the principles of the invention.

FIG. 10 shows illustrative apparatus 1000. Apparatus 1000 includes entrance doorway 1003 and exit doorway 1005. Sensor 1001 may be mounted on entrance doorway 1003 and exit doorway 1005. Sensor 1003 may detect a person entering or exiting ABC Store. Based on information detected by sensor 1001, a number of customers inside ABC Store may be determined. Data from sensor 1001 may be utilized by analysis engine 709 (shown in FIG. 7). Based on data obtained from sensor 1001 analysis engine 709 may determine a surcharge.

Figure 11:
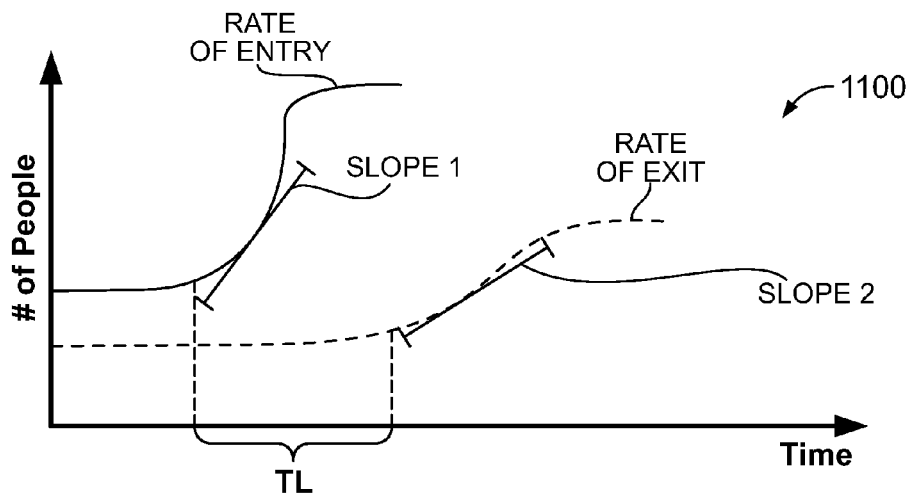
FIGS. 11-13 show illustrative information in accordance with the principles of the invention.

FIG. 11 shows illustrative information 1100. Information 1100 shows rate of customers entering a merchant location. Information 1100 shows a rate of customers exiting the merchant location. The rate of customers exiting the merchant location may lag behind the rate of customers entering the merchant location. Time lag TL may represent an amount of time a customer spends inside the merchant location. A surcharge may be adjusted based on TL. For example, the surcharge may be adjusted to incentive customers to spend more time inside the merchant location.

The rate of customers entering the merchant location may be associated with slope 1. The rate of customers exiting the merchant location may be associated with slope 2. A surcharge may be adjusted based on slope 1 and/or slope 2. For example, when slope 1 is steeper than slope 2, customers may be entering the merchant location at a faster rate than they are exiting. When customers enter at a faster rate than they exit, a wait time to check-out of the merchant location may increase.

To prevent the wait from increasing beyond a threshold, a surcharge may be waived at underutilized checkout lanes. The waiver of the surcharge may encourage customers to use the underutilized checkout lanes. Use of the underutilized checkout lanes may reduce checkout wait times at the merchant location.

Figure 12:
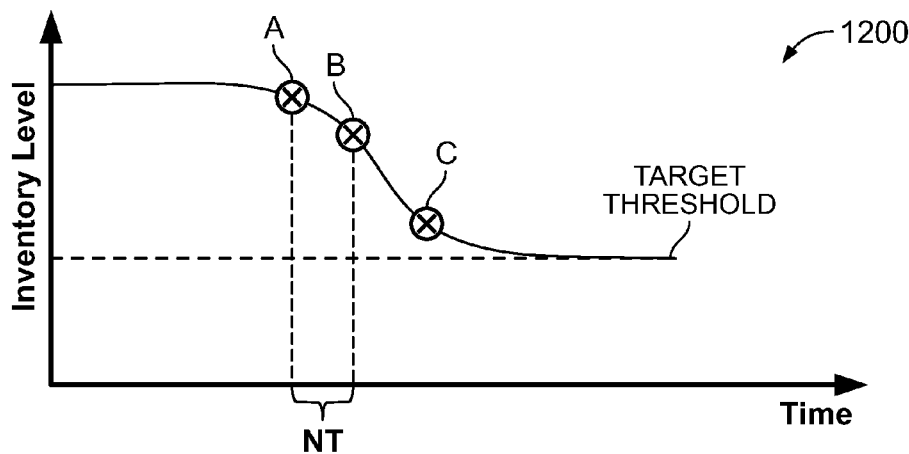

FIG. 12 shows illustrative information 1200. Information 1200 shows inventory level plotted against time. Information 1200 shows a target threshold. The target threshold may correspond to a critical inventory level. If the inventory level decreases below the target threshold, the inventory level may be insufficient to meet customer demand.

To prevent the inventory from falling below the target threshold, when a change in the inventory level corresponding to point A is detected, a surcharge notice may be displayed. The surcharge notice may inform customers that following passage of a notice time, a surcharge will be imposed at a merchant location. The surcharge may be imposed on purchases that include an item associated with the inventory level. Imposing the surcharge may encourage customer to purchase less of the item.

A passage of the notice time may correspond to point B. At point B, the surcharge may begin to be imposed at the merchant location. At point C a decrease in the inventory level may begin to level off. Imposing the surcharge may have reduced demand for items included in the inventory level. Information 1200 shows that the inventory level does not fall below the target threshold.

Figure 13:
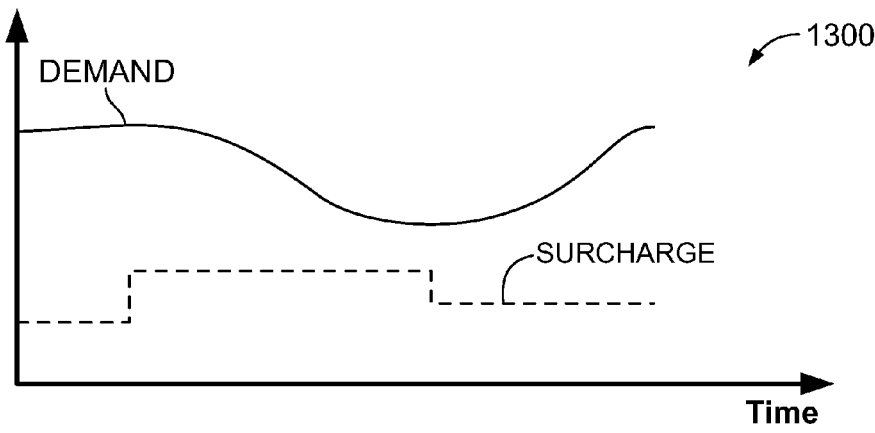

FIG. 13 shows illustrative information 1300. Information 1300 shows demand for a product plotted over time. Information 1300 shows a surcharge corresponding to demand at a particular time. Information 1300 shows that when the surcharge increases there is a corresponding decrease in demand. The surcharge may be imposed with an intent to reduce demand. A reduction is demand may prevent an inventory level from falling below a critical level.

Information 1300 also shows that when the surcharge is decreased, there is corresponding increase in demand. The surcharge may be waived with an intent to increase demand. For example, to stimulate customers to purchase a product, a merchant may waive a surcharge that would otherwise be imposed if the customer purchases a particular item. The surcharge waiver may stimulate sales of the item.

Figures 14, 15:
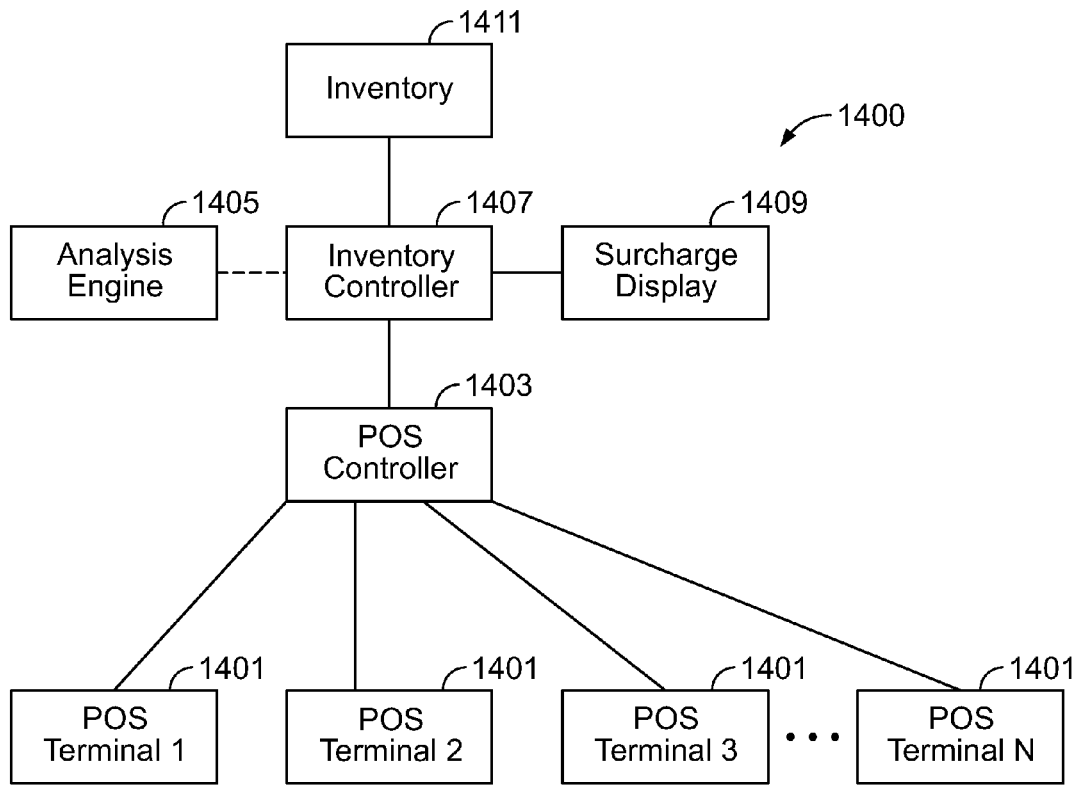

FIG. 14 shows illustrative system 1400. System 14000 includes POS terminals 1401. POS terminals may include one or more features of POS terminals 701 (shown in FIG. 7). System 1400 may include POS controller 1403. POS controller 1403 may include one or more features of POS controller 703 (shown in FIG. 7).

System 1400 may include inventory controller 1407. Inventory controller 1407 may monitor changes in inventory 1411. Inventory 1411 may be one or a plurality of inventories utilized by a merchant. Inventory controller 1407 may monitor changes in a plurality of inventories 1411. Based on a change in inventory 1411, the inventory controller may determine a surcharge. The surcharge may be determined based on effecting further change in inventory 1411. The surcharge may be determined based on reversing the change in inventory 1411.

Inventory controller 1407 may communicate with analysis engine 1405. Analysis engine 1405 may include one or more features of analysis engine 709 (shown in FIG. 7). Analysis engine 1405 may correlate transaction attributes received from POS terminals 1401 with changes in inventory 1411 detected by inventory controller 1407. Analysis engine 1405 may correlate transaction attributes included in stored transaction records with changes in inventory 1411 detected by inventory controller 1407. The stored transaction records may be obtained from a database such as database 711 (shown in FIG. 7).

Inventory controller 1407 may transmit surcharge information to display 1409. The surcharge information may include one or more surcharge attributes. Display 1409 may present the surcharge information as a surcharge notice. Display 1409 may be positioned at an entrance to a merchant location. Display 1409 may be positioned inside the merchant location.

FIG. 15 shows illustrative transaction record 1500. Transaction record 1500 may be generated based on transaction information received and/or available at a time of purchase. The transaction record may include point-of-sale ("POS") attributes 1501. POS attributes 1501 may include transaction information, customer information and merchant information. Exemplary POS attributes 1501 may include a date, a time, a check-out lane indicator or any suitable transaction attribute available at a point-of-sale.

Transaction record 1500 may include surcharge attributes 1503. Exemplary surcharge attributes 1503 may include a surcharge amount, maximum surcharge amount, surcharge fraction, transaction cost or other suitable surcharge information.

Transaction record 1500 may include synoptic attributes 1505. Synoptic attributes 1505 may include attributes derived based on other transaction attributes. Synoptic attributes 1505 may include attributes derived based on other transaction attributes. The synoptic attributes may be determined based on a pattern detected in a plurality of transaction records. Exemplary synoptic attributes may include a merchant transaction statistic, a market statistic and an issuer statistic. The synoptic attributes 1505 may be concatenated to transaction record 1500. Synoptic attributes 1505 may be concatenated to transaction record 1500 after execution of the transaction.

FIG. 16 shows illustrative POS attributes 1601 and illustrative synoptic attributes 1603. POS attributes 1601 may include location 1604. Location 1604 may be associated with a POS terminal. Location 1604 may be associated with an address. POS attributes 1601 may include time 1606 and date 1608. POS attributes 1601 may include amount 1610 and number of items 1612. Amount 1610 may correspond to a price of the product. Number of items 1612 may correspond to a number of items purchased by a customer in a transaction.

POS attributes 1601 may include state/province 1614. State/province 1614 may be associated with regulations governing imposition of a surcharge. POS attributes 1601 may include address 1616.

POS attributes 1601 may include checkout number 1618. A merchant may impose a different surcharge at different check-out lines. The merchant may offer no or a reduced surcharge if a self-checkout line is utilized. The self-checkout line may be associated with a checkout number 1618.

POS attributes 1601 may include credit card type 1620. Credit card type 1620 may correspond to the payment instrument presented by a customer to pay for a purchase. A surcharge schedule or surcharge amount may be associated with credit card type 1620.

POS attributes 1601 may include merchant category code ("MCC") 1622. MCC 1622 may group merchants that supply similar products. Some merchants in MCC 1622 may impose a surcharge, while others may not. Merchants within MCC 1622 may surcharge at different rates or amounts.

FIG. 16 includes synoptic attributes 1603. Synoptic attributes 1603 may include transaction volume 1621, total sales 1623 and fiscal period 1625. Fiscal period 1625 may be determined based on a time associated with transaction record 1300. Transaction volume 1621 and total sales 1623 may be associated with fiscal period 1625.

For example, transaction records may be sorted by date 1608 and location 1604. A first number of transaction records may include the month of September and an address on Main Street. The first number may be appended to each transaction record that includes the date in September and the address on Main Street. The first number may correspond to transaction volume 1621. The first number may be a synoptic attribute. A second number of transaction records may include a date in the month of August and the address on Main Street. The second number may be a synoptic attribute.

The first number may be compared to the second number. A result of the comparing may be a synoptic attribute. The first number may be concatenated to transaction records that include the date in September. The second number may be concatenated to transaction records that include the date in August. A result of the comparing may be concatenated to transaction records that include either the date in August or the date in September.

Synoptic attributes 1603 may include credit card payment ratio 1627. Credit card payment ratio 1627 may include a comparison of a number of purchases made using a credit card to a number of purchases made using alternative payment methods. The ratio may be computed for a particular merchant, MCC, time/date, location credit card type or other suitable transaction attribute.

Synoptic attributes 1603 may include transaction frequency 1629, total transactions per credit card type 1633 and average transaction cost 1635. Average transaction cost 1635 may be calculated for a plurality of transaction records.

For example, each transaction record that includes a particular POS attribute, such as a purchase made at location X, may include a variable transaction cost Y. Transaction cost Y may vary based on transaction attributes present in a transaction record. The transaction cost Y may correspond to a surcharge attribute (shown above in Table 4). Average transaction cost 1635 may correspond to an average transaction cost associated with location X. Average transaction cost 1635 may be appended to each transaction record that includes the attribute corresponding to location X.

Synoptic attributes 1603 may include credit risk 1637. An issuer may associate each authorized transaction with a credit risk. The issuer may append the credit risk to the transaction record. The credit risk may be determined based on a credit history associated with credit card type 1620. The credit risk may be determined based on a credit history associated with the purchasing customer.

Figure 17:
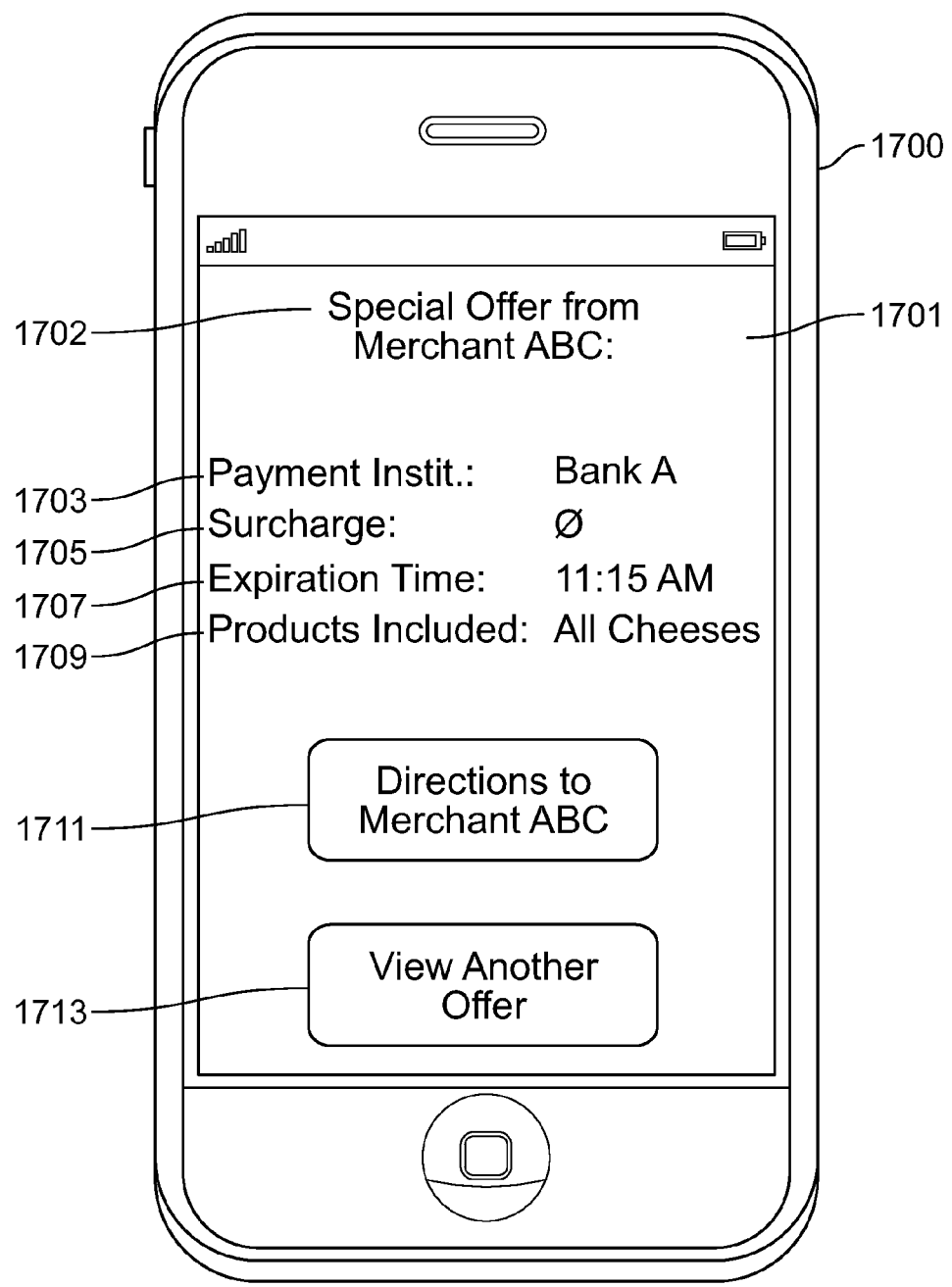
FIG. 17 shows illustrative apparatus in accordance with the principles of the invention.

FIG. 17 shows illustrative apparatus 1700. Apparatus 1700 is shown configured to display surcharge notice 1701. Surcharge notice 1701 may be transmitted to device 1700 is response to a purchase made by a user of device 1700. Device 1700 may include one or more features of POS terminal 701 (shown in FIG. 7).

The user may make the purchase using device 1700. Based on the purchase a system such as system 700 (shown in FIG. 7) device 1700 may receive surcharge notice 1701. Device 1700 may receive surcharge notice 1701 in response to calculation of an inter-merchant proximity. Device 1700 may receive surcharge notice 1701 in response to detection of device 1700 in a location near a merchant location.

Surcharge notice 1701 includes merchant 1702. Merchant 1702 is offering a promotion associated with payment instrument 1703. Merchant 1702 is offering a "zero" surcharge 1705 on purchases made using payment instrument 1703. The promotion expires at expiration time 1707. The promotion applies to products 1709 sold by merchant 1702.

The user of device 1700 may utilize option 1711 to obtain directions to merchant 1702. The user of device 1700 may utilize option 1713 to view additional offers. The additional offers may be associated with a current location of device 1700. The additional offers may be associated with a prior purchase made by the user of device 1700.

Figure 18:
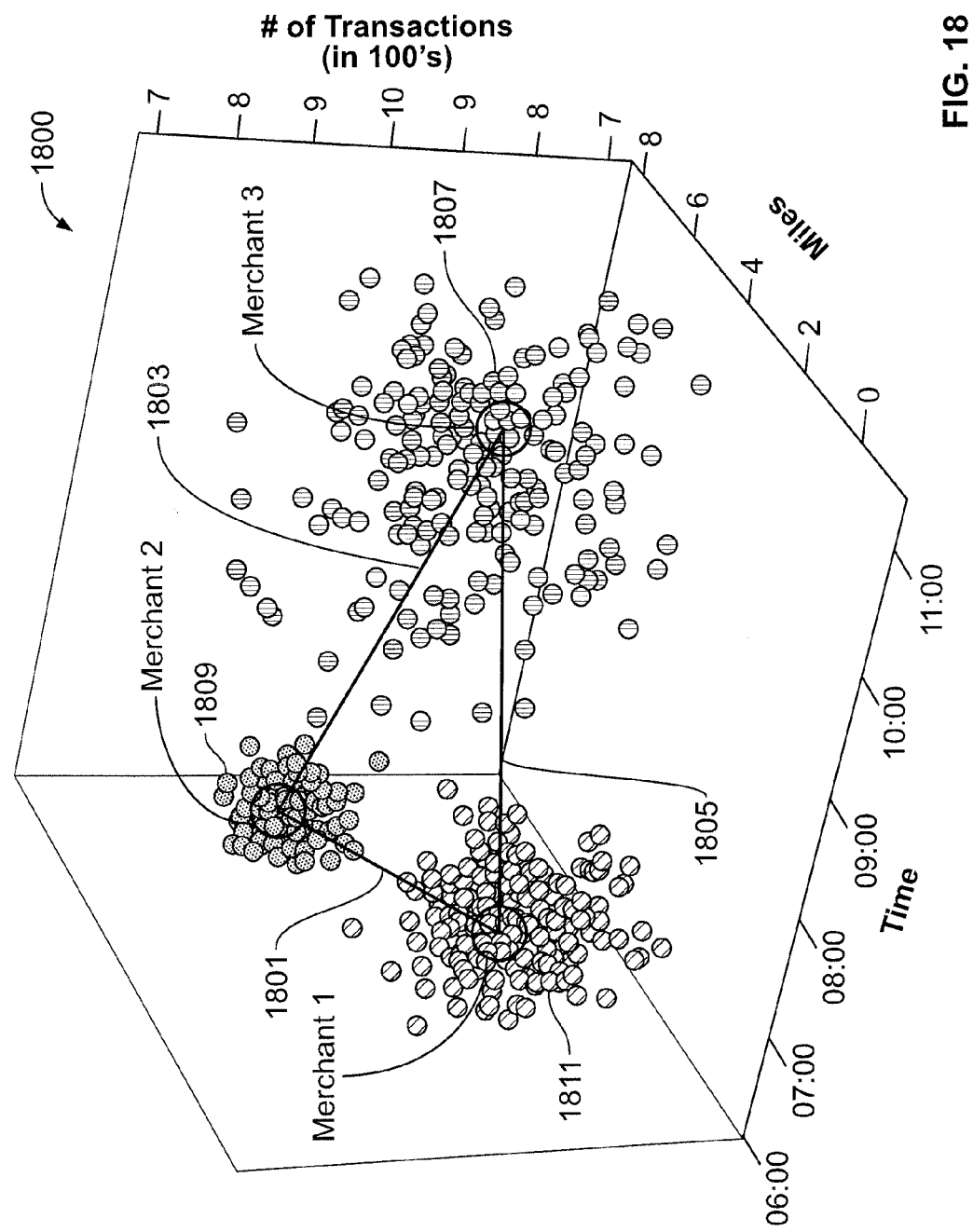
FIG. 18 shows illustrative information in accordance with the principles of the invention.

FIG. 18 shows illustrative information 1800. Information 1800 shows transactions that have occurred at merchant 1, merchant 2 and merchant 3. Each transaction is represented by a shaded circle. Information 1800 shows that a high concentration of transactions 1811 occurred at merchant 1 between 06:00 hours and 08:00 hours and a high concentration of transactions 1809 occurred at merchant 2 between 06:00 hours and 08:00 hours. A merchant may operate a network of merchant locations. Information 1800 also shows that the high concentration of transactions 1811 and 1809 occurred at merchant locations associated with merchant 1 and merchant 2 that are within 2-3 miles of each other.

Information 1800 shows transactions associated with merchant 3. A high concentration of transactions 1807 occurred at merchant 3 between 07:00 hours and 11:00 hours and a high concentration of transactions 1811 occurred at merchant 1 between 07:00 hours and 11:00 hours. A high concentration of transactions 1809 and 1807 occurred at both merchant 3 and merchant 2 between 06:00 hours and 11:00 hours.

Information 1800 also shows that the high concentration of transactions 1807 and 1811 occurred at merchant locations associated with merchant 3 and merchant 1 that are within 1-2 miles of each other. The high concentration of transactions 1807 and 1809 occurred at merchant locations associated with merchant 3 and merchant 2 that are within 1 mile of each other.

Based on information 1800 inter-merchant proximities 1801, 1803 and 1805 may be determined. Based on inter-merchant proximities 1801, 1803 or 1805 a surcharge notice may be transmitted to a customer. For example, a POS controller such as controller 703 (shown in FIG. 7) may receive a transaction record. One or more transaction attributes included in the transaction record may indicate that the received transaction record corresponds to concentration 1809. A first transaction attribute may correspond to merchant 2. A second transaction attribute may correspond to time 06:30 hours.

Based on the association between the received transaction record and concentration 1809, the POS controller may transmit to the customer a surcharge notice issued by merchant 1. The surcharge notice may include a special promotion being offered by merchant 1. The promotion may expire after 09:00 hours.

Based on the association between the received transaction record and concentration 1809, the POS controller may transmit to the customer a surcharge notice issued by merchant 3. The surcharge notice may include a special promotion being offered by merchant 3. The promotion may only be honored at locations associated with merchant 3 that are within 2 miles of a merchant location included in the received transaction record. The promotion may only be transmitted to the customer at 10:00 hours.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for determining a surcharge imposed on a transaction between two or more transaction participants have been provided. Persons skilled in the art will appreciate that the present invention can be practiced by other than the described embodiments, which are presented for purposes of illustration rather than of limitation. The present invention is limited only by the claims that follow.

What is claimed is:

1. One or more non-transitory computer-readable media storing computer-executable instructions which, when executed by a processor on a computer system, perform a method for managing a queue at a merchant location, the method comprising:

imposing a first surcharge at a first checkout lane;
monitoring a transaction activity at the first checkout lane;
imposing a second surcharge at a second checkout lane when the transaction activity at the first checkout lane exceeds a pre-determined threshold;
wherein monitoring the transaction activity comprising monitoring a number of transactions processed by a point-of-sale device during a pre-determined period of time; and
wherein the second surcharge is determined based on attaining a target level of transaction activity at the first checkout lane.

2. The media of claim 1, the monitoring the transaction activity comprising monitoring a number of items scanned by a point-of-sale device during a pre-determined period of time.

3. The media of claim 1 further comprising, when the transaction activity at the first checkout lane is below the pre-determined threshold, imposing the first surcharge at the second checkout lane.

4. The media of claim 1 wherein:
the first checkout lane is manned; and
the second checkout lane is unmanned.

5. The media of claim 1 wherein the first surcharge is greater in magnitude than the second surcharge.

6. A system for managing a checkout queue, the system comprising a point-of-sale ("POS") controller configured to:
impose a first surcharge at a first POS terminal;
detect a change in a queue performance metric, the queue performance metric corresponding to a length of a patron queue waiting to use the first POS terminal;
determine whether the change exceeds a threshold value;
impose a second surcharge at a second POS terminal when the change in the queue performance metric exceeds the threshold value; and
determine the second surcharge based on attaining a target queue performance metric.

7. The system of claim 6 wherein the first POS terminal and the second POS terminal are located at a shared street address.

8. The system of claim 6 wherein the POS controller is further configured to transmit an attribute of the second surcharge to a display when the change in the queue performance metric exceeds the threshold.

9. The system of claim 8 wherein, when the change in the queue performance metric exceeds the threshold value at a first time, the POS controller is further configured to impose the second surcharge at the second POS terminal at a second time, the second time being later than the first time.

10. The system of claim 9 wherein a duration between the first time and the second time corresponds to a surcharge notice time.

11. The system of claim 6 wherein:
the POS controller is configured to receive transactions from a plurality of manned POS terminals;
the queue performance metric is associated with one of the plurality of manned POS terminals; and
the POS controller is configured to impose the second surcharge when the change in the queue performance metric associated with the one of the plurality of manned POS terminals exceeds the pre-determined threshold.

12. The system of claim 6 further comprising:
a first sensor configured to monitor patrons entering a merchant location;
a second sensor configured to monitor patrons exiting the merchant location; and
wherein, the POS controller is further configured to determine:
a first rate of patrons entering the merchant location;
a second rate of patrons exiting the merchant location; and
the change in the queue performance metric based on a difference between the first rate and the second rate.

13. The system of claim 12, wherein, when the merchant location comprises a plurality of point-of-sale ("POS") terminals, the POS controller is further configured to impose the second surcharge at a subset of the plurality of POS terminals.

14. The system of claim 13 wherein the subset corresponds to self-serve POS terminals.

15. The system of claim 12 the POS controller further configured to:
determine a queue wait time based on the difference between the first rate and the second rate; and
determine the second surcharge based on attaining a target queue wait time within a pre-determined time period.

16. The system of claim 6 wherein the second surcharge is less than the first surcharge.

17. The system of claim 6, wherein the POS controller is further configured to apply the second surcharge when a customer purchases a threshold number of items.

* * * * *